(12) United States Patent
MacManus et al.

(10) Patent No.: US 12,510,001 B2
(45) Date of Patent: Dec. 30, 2025

(54) TURBINE SHROUD AND TURBOMACHINE WITH COOLING CIRCUIT

(71) Applicant: GE Infrastructure Technology LLC, Greenville, SC (US)

(72) Inventors: Katherine Courtlyn MacManus, Greenville, SC (US); Daniel Robert Burnos, Greer, SC (US); Ibrahim Sezer, Greenville, SC (US); Bradley James Miller, Simpsonville, SC (US); Johnathan Ray Wallen, Greenville, SC (US)

(73) Assignee: GE Infrastructure Technology, LLC, Greenville, SC (US)

( * ) Notice: Subject to any disclaimer, the term of this patent is extended or adjusted under 35 U.S.C. 154(b) by 0 days.

(21) Appl. No.: 19/297,400

(22) Filed: Aug. 12, 2025

(65) Prior Publication Data
US 2025/0369370 A1    Dec. 4, 2025

Related U.S. Application Data

(63) Continuation of application No. 18/642,882, filed on Apr. 23, 2024, now Pat. No. 12,410,730.

(51) Int. Cl.
*F01D 25/12* (2006.01)
*F01D 25/24* (2006.01)

(52) U.S. Cl.
CPC ............ *F01D 25/12* (2013.01); *F01D 25/246* (2013.01); *F05D 2240/11* (2013.01); *F05D 2260/201* (2013.01)

(58) Field of Classification Search
CPC ........ F01D 11/08; F01D 25/246; F01D 25/12; F01D 25/14; F05D 2240/11
See application file for complete search history.

(56) References Cited

U.S. PATENT DOCUMENTS

| | | | |
|---|---|---|---|
| 5,071,313 A | 12/1991 | Nichols | |
| 5,584,651 A * | 12/1996 | Pietraszkiewicz | ...... F01D 25/12 415/173.1 |

(Continued)

FOREIGN PATENT DOCUMENTS

EP    218446 B1    6/2019

OTHER PUBLICATIONS

Non Final Office Action dated Jan. 13, 2025 for U.S. Appl. No. 18/642,882, filed Apr. 23, 2024; pp. 15.

(Continued)

*Primary Examiner* — Eldon T Brockman
(74) *Attorney, Agent, or Firm* — James Pemrick; Charlotte Wilson; Hoffman Warnick LLC

(57) ABSTRACT

The present disclosure provides a turbine shroud with a cooling circuit and turbomachine with the subject turbine shroud. The turbine shroud includes a body with a rib thereon. The rib extends between a first and second sidewall of the body, the sidewalls extending between a forward end and an aft end of the body. The body is coupled to a turbomachine casing or an intermediate component for coupling the body to the turbomachine casing. A cooling circuit within the body is in fluid communication with a cooling chamber adjacent the body. The cooling circuit includes a plurality of inlet passages extending through the rib of the body, and a plurality of outlet passages fluidly coupled to the inlet passage and extending through an external surface of the body. The cooling circuit also includes a first plenum within the rib and in fluid communication with the plurality of inlet passages.

20 Claims, 26 Drawing Sheets

(56) References Cited

U.S. PATENT DOCUMENTS

| | | | |
|---|---|---|---|
| 5,957,657 | A | 9/1999 | Akita et al. |
| 6,139,257 | A | 10/2000 | Proctor |
| 6,354,795 | B1 | 3/2002 | White |
| 7,284,954 | B2 | 10/2007 | Parker et al. |
| 7,670,108 | B2 | 3/2010 | Liang |
| 9,015,944 | B2 | 4/2015 | Lacy et al. |
| 9,651,805 | B2 | 5/2017 | Zhang et al. |
| 9,995,172 | B2 | 6/2018 | Dutta et al. |
| 10,385,727 | B2 | 8/2019 | Dutta et al. |
| 10,443,437 | B2 | 10/2019 | Lacy et al. |
| 10,975,724 | B2 | 4/2021 | Sezer et al. |
| 10,989,068 | B2* | 4/2021 | Packer ............... F01D 25/246 |
| 11,371,702 | B2 | 6/2022 | Berry et al. |
| 2006/0140753 | A1 | 6/2006 | Romanov |
| 2013/0011238 | A1 | 1/2013 | Liang |
| 2015/0013345 | A1* | 1/2015 | Porter ............... F01D 25/12 |
| | | | 60/806 |
| 2017/0122562 | A1 | 5/2017 | Berry |
| 2020/0025026 | A1* | 1/2020 | Packer ............... F01D 11/08 |
| 2020/0131929 | A1 | 4/2020 | Lacy et al. |

OTHER PUBLICATIONS

Notice of Allowance dated May 12, 2025 for U.S. Appl. No. 18/642,882, filed Apr. 23, 2025; pp. 5.

* cited by examiner

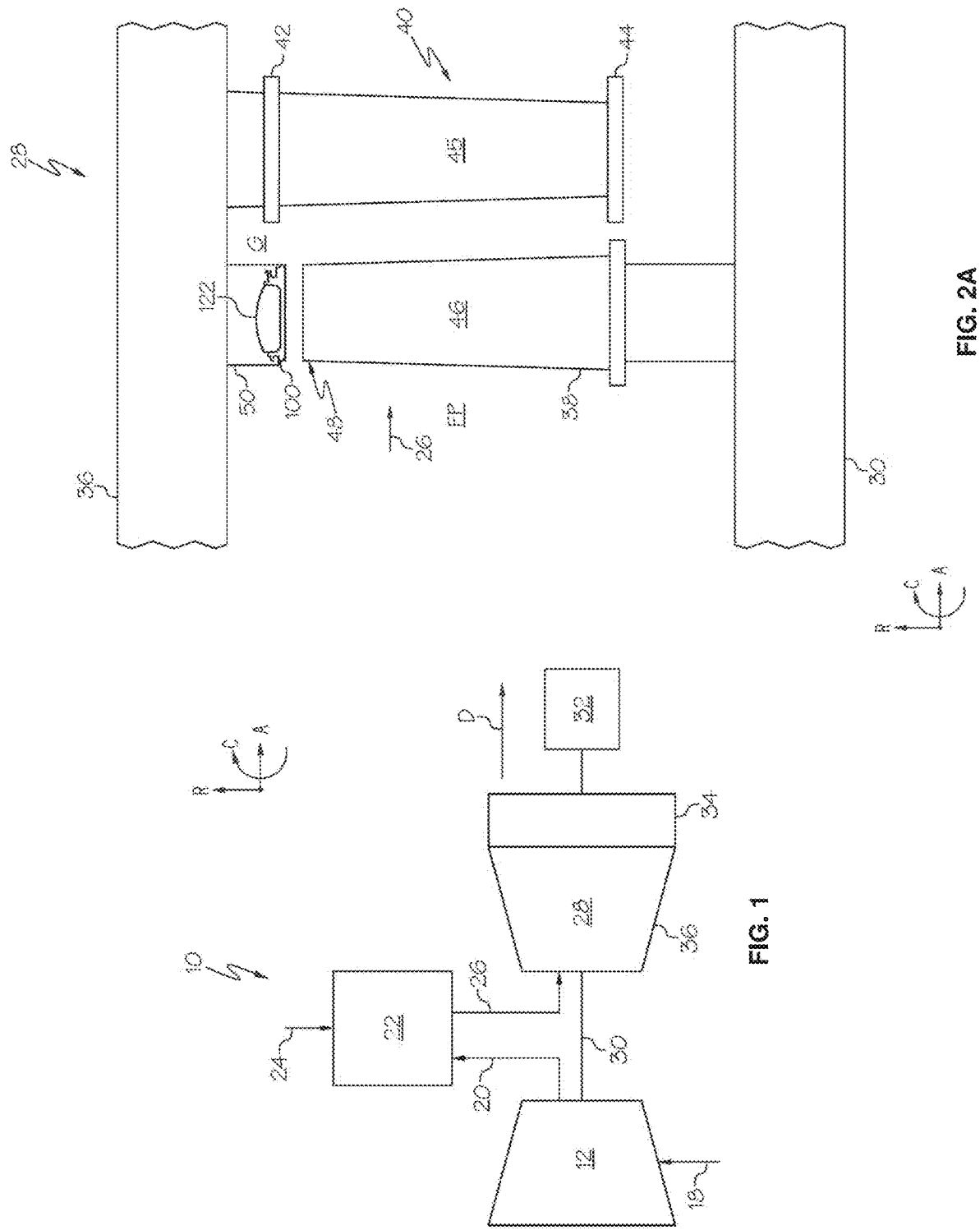

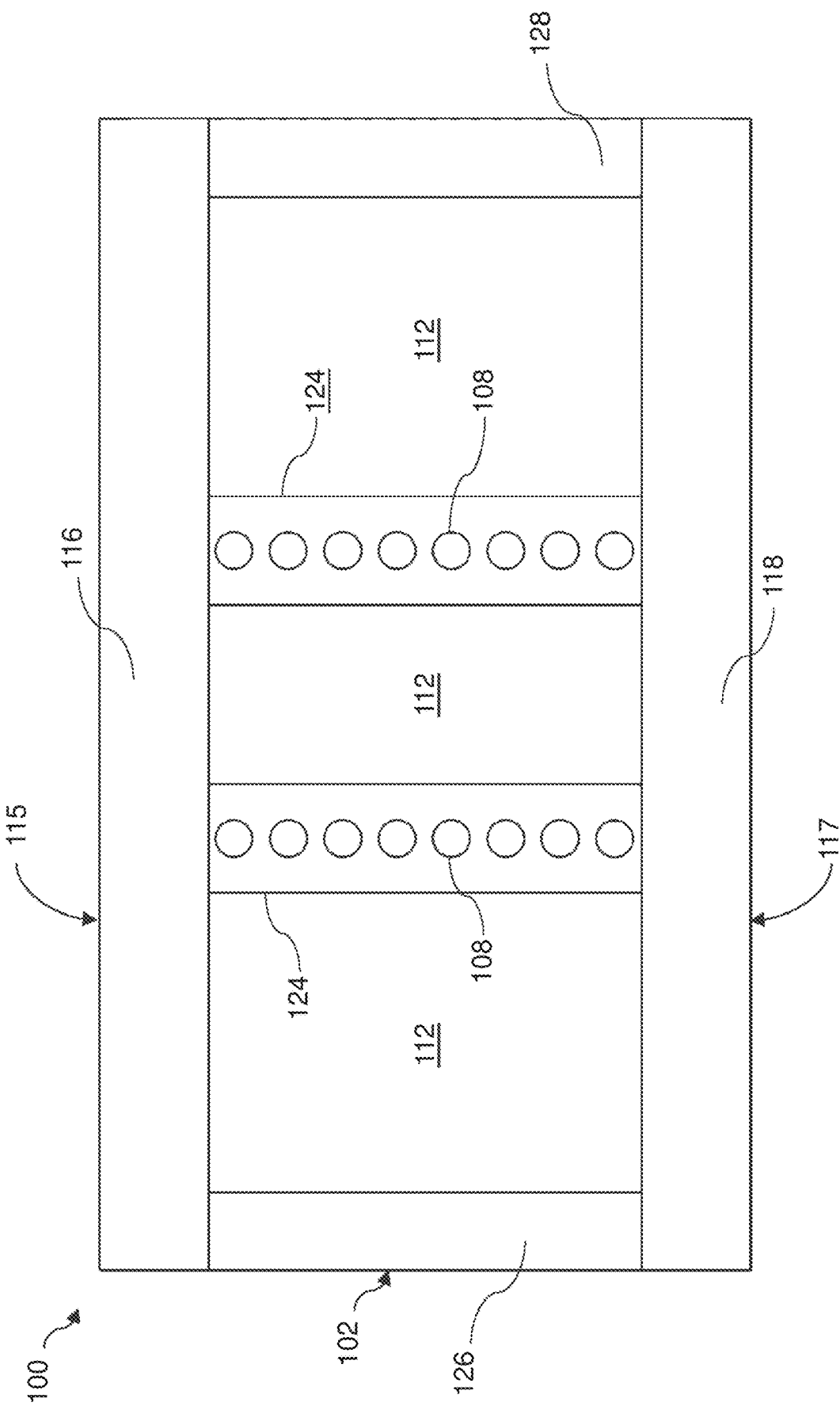

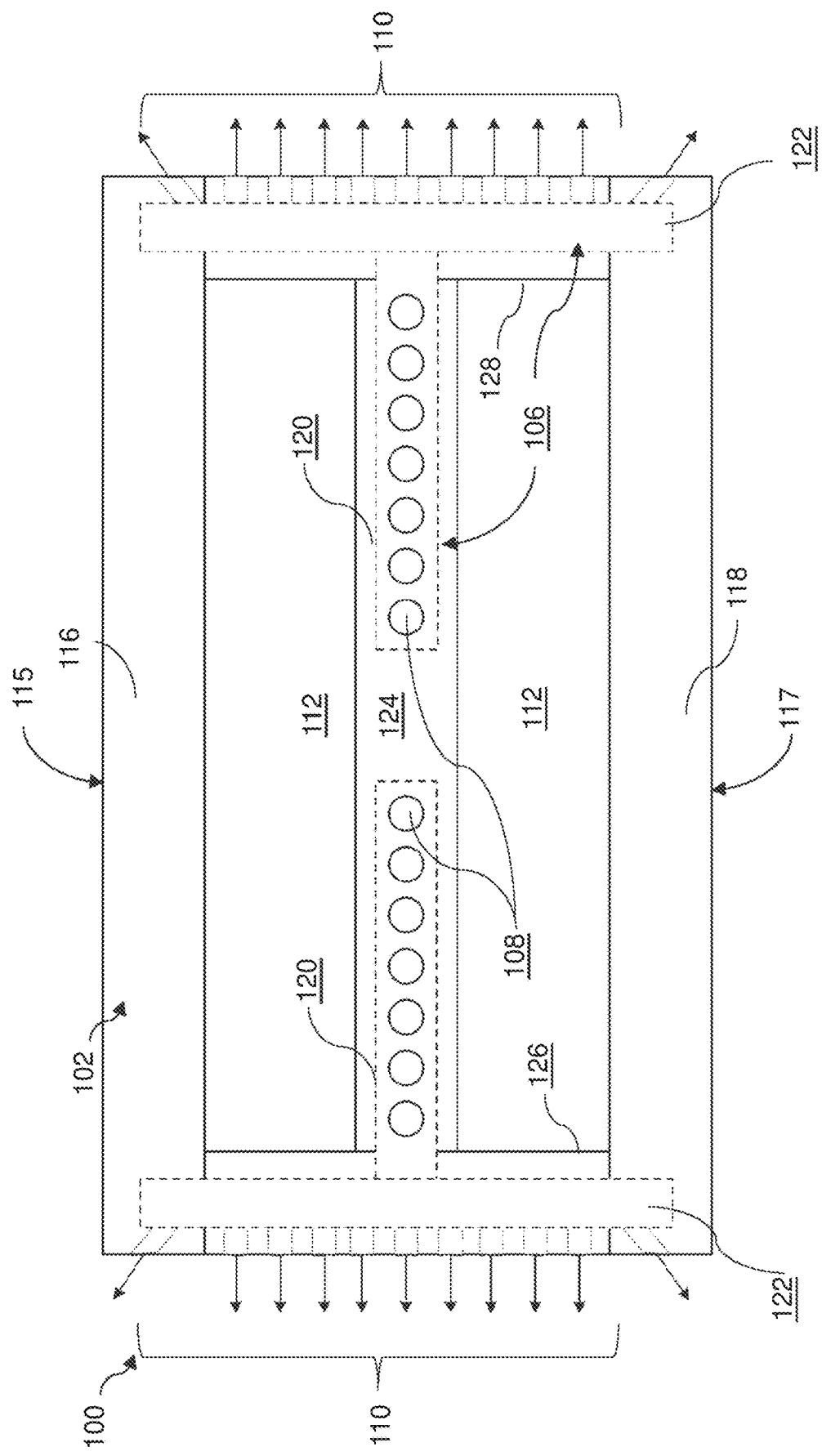

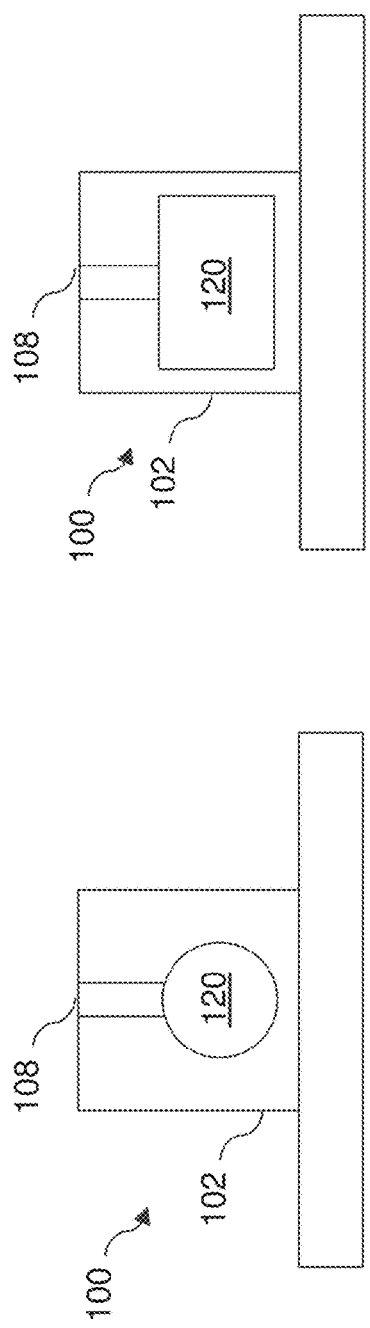
FIG. 23A
FIG. 23C
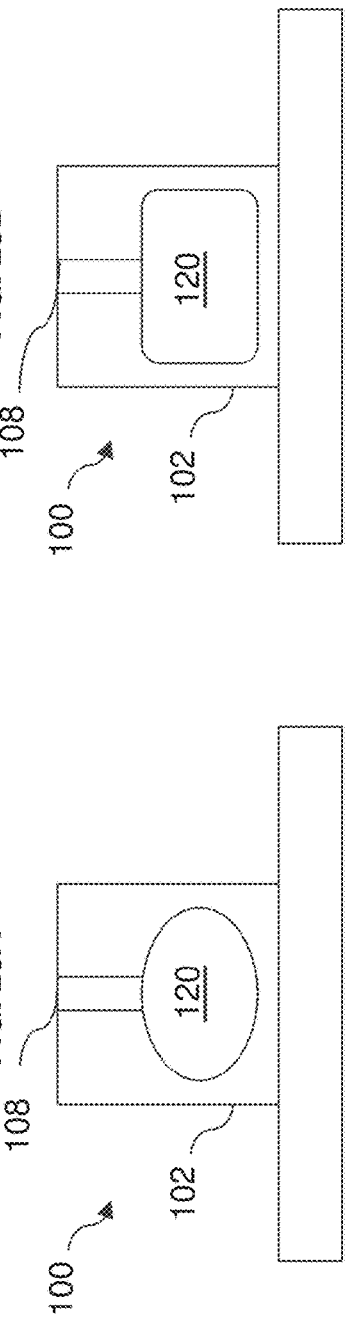
FIG. 23B
FIG. 23D
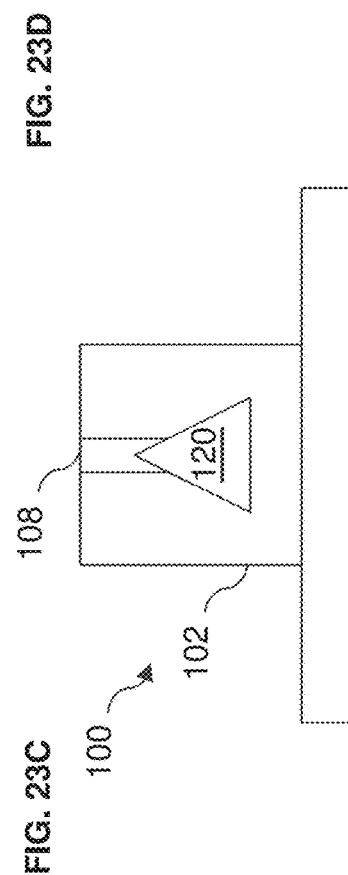
FIG. 23E

TURBINE SHROUD AND TURBOMACHINE WITH COOLING CIRCUIT

This application is a continuation in-part of Non-provisional application Ser. No. 18/642,882 filed on Apr. 23, 2024, and entitled "TURBINE SHROUD AND TURBOMACHINE WITH COOLING CIRCUIT," currently pending, the entirety of which is incorporated herein by reference.

TECHNICAL FIELD

The disclosure relates generally to turbomachines and, more particularly, to turbine shrouds.

BACKGROUND

Conventional turbomachines, such as gas turbine systems, generate power for electric utilities. In general, gas turbine systems generate power by passing a fluid (e.g., hot gas) through a turbine component of the gas turbine system. More specifically, inlet air may be drawn into a compressor to be compressed and subsequently mixed with fuel to be ignited by a combustor to form the operational fluid (e.g., hot gas) of the gas turbine system. The fluid then flows through a fluid flow path for rotating a plurality of rotating blades and a rotor or shaft of the turbine component for generating the power. The fluid may be directed through the turbine component via the plurality of rotating blades and a plurality of stationary nozzles or vanes positioned between the rotating blades. As the plurality of rotating blades rotate the rotor of the gas turbine system, a generator, which is coupled to the rotor, may generate power from the rotation of the rotor.

To improve operational efficiency, rotating blades may include tip shrouds on radially outer ends thereof. Tip shrouds interact with an inner surface of a stationary casing to direct the operational fluid (e.g., hot gas). During operation over the lifespan of a turbomachine, tip shrouds may weaken due to stress of rotational forces exerted on rotating blades or extended exposure to temperatures.

In further embodiments, turbine shrouds may be mounted to the stationary casing in a position radially outboard of the tips of the rotating blades. The turbine shrouds form an annular ring about the rotating blades. Due to their extended exposure to high temperatures from the combustion gases, turbine shrouds require efficient cooling to achieve the desired component life.

SUMMARY

All aspects, examples and features mentioned below can be combined in any technically possible way.

An aspect of the disclosure provides a turbine shroud including: a body including a structural member thereon, wherein the body is configured for coupling to a turbomachine casing; and a cooling circuit within the body and in fluid communication with a cooling chamber defined radially outward of the body, the cooling circuit including: an inlet passage extending through the structural member of the body, and an outlet passage fluidly coupled to the inlet passage and extending through an external surface of the body.

Another aspect of the disclosure provides any of the preceding aspects, and wherein the structural member includes a rib on a radially outward surface of the body, and the cooling circuit includes a first plenum extending within the rib of the body and in fluid communication with the inlet passage.

Another aspect of the disclosure provides any of the preceding aspects, and wherein the cooling circuit further includes a second plenum fluidly coupled to the first plenum and within a different structural member of the body, wherein the second plenum fluidly couples the first plenum to the outlet passage.

Another aspect of the disclosure provides any of the preceding aspects, and wherein the inlet passage is shaped to direct a cooling air onto an underside of the structural member within the first plenum.

Another aspect of the disclosure provides any of the preceding aspects, and further comprising an impingement panel positioned between the structural member of the body and cooling chamber, wherein the impingement panel includes a plurality of impingement holes fluidly coupling the cooling chamber to the inlet passage of the cooling circuit.

Another aspect of the disclosure provides any of the preceding aspects, and wherein the impingement panel extends between a first hook and a second hook extending outward from the body.

Another aspect of the disclosure provides any of the preceding aspects, and further comprising an intermediate component disposed between the body and the turbomachine casing; and wherein the first hook and the second hook engage respective recesses in the intermediate component.

Another aspect of the disclosure provides any of the preceding aspects, and wherein the first hook and the second hook are configured to engage respective recesses in the turbomachine casing.

Another aspect of the disclosure provides any of the preceding aspects, and wherein the body further includes: a forward end positioned opposite an aft end; a first sidewall extending between the forward end and the aft end; a second sidewall extending between the forward end and the aft end, opposite the first sidewall; an outer surface extending between the first sidewall and the second sidewall, the outer surface oriented toward the cooling chamber and having the structural member thereon; and an inner surface oriented toward a blade structure and a hot gas flow path for the turbomachine.

Another aspect of the disclosure provides any of the preceding aspects, and wherein the structural member is a first rib and a second rib, each of the first rib and the second rib extending between the forward end and the aft end and including the inlet passage into a respective cooling circuit.

Another aspect of the disclosure provides any of the preceding aspects, and wherein the cooling circuit further includes a second plenum fluidly coupled to the first plenum and within a different structural member of the body, wherein the second plenum fluidly couples the first plenum to the outlet passage defined in one of the forward end or the aft end.

Another aspect of the disclosure provides any of the preceding aspects, and wherein the cooling circuit further includes at least two second plenums fluidly coupled to respective first plenums and within different structural members of the body, wherein the at least two second plenums fluidly couple the respective first plenums to outlet passages defined in the forward end and the aft end.

Another aspect of the disclosure provides any of the preceding aspects, and wherein the structural member is a first rib extending between the first sidewall and the second sidewall, the first rib defining at least one first plenum in fluid communication with the inlet passage.

Another aspect of the disclosure provides any of the preceding aspects, and wherein the cooling circuit further includes a second plenum fluidly coupled to the at least one first plenum and within a different structural member of the body, wherein the second plenum fluidly couples the at least one first plenum to the outlet passage defined in at least one of the first sidewall or the second sidewall.

Another aspect of the disclosure provides a turbomachine including: a blade structure configured to rotate about a rotation axis of a rotor; and a turbine shroud oriented toward the blade structure and coupled to a turbomachine casing, the turbine shroud including: a body including a structural member thereon, wherein the body is coupled to one of a turbomachine casing or an intermediate component for coupling the body to the turbomachine casing; and a cooling circuit within the body and in fluid communication with a cooling chamber adjacent the body, the cooling circuit including: an inlet passage extending through the structural member of the body, and an outlet passage fluidly coupled to the inlet passage and extending through an external surface of the body.

Another aspect of the disclosure provides any of the preceding aspects, and wherein the structural member includes a rib on a surface of the body, and the cooling circuit includes a first plenum extending within the rib of the body and in fluid communication with the inlet passage.

Another aspect of the disclosure provides any of the preceding aspects, and wherein the cooling circuit further includes a second plenum fluidly coupled to the first plenum and within a different structural member of the body, wherein the second plenum fluidly couples the first plenum to the outlet passage.

Another aspect of the disclosure provides any of the preceding aspects, and further comprising an impingement panel positioned between the structural member of the body and cooling chamber, wherein the impingement panel includes a plurality of impingement holes fluidly coupling the cooling chamber to the inlet passage of the cooling circuit.

Another aspect of the disclosure provides any of the preceding aspects, and wherein the impingement panel extends between a first hook and a second hook extending outward from the body.

Another aspect of the disclosure provides any of the preceding aspects, and wherein the body further includes: a forward end positioned opposite an aft end; a first sidewall extending between the forward end and the aft end; a second sidewall extending between the forward end and the aft end, opposite the first sidewall; an outer surface extending between the first sidewall and the second sidewall, the outer surface oriented toward the cooling chamber and having the structural member thereon; and an inner surface oriented toward a blade structure and a hot gas flow path for the turbomachine.

Another aspect of the disclosure provides a turbine shroud comprising: a body configured for coupling to a turbomachine casing, the body including a rib thereon and a forward end positioned opposite an aft end, wherein the rib is on a radially outward surface of the body, the rib extending from a first sidewall extending between the forward end and the aft end to a second sidewall extending between the forward end and the aft end opposite the first sidewall; and a cooling circuit within the body and in fluid communication with a cooling chamber defined radially outward of the body, the cooling circuit including: a plurality of inlet passages extending through the rib of the body and spaced along a length thereof, a plurality of outlet passages fluidly coupled to the plurality of inlet passages and extending through an external surface of the body, and a first plenum extending within the rib of the body and in fluid communication with the plurality of inlet passages.

Another aspect of the disclosure provides any of the preceding aspects, and further comprising an impingement panel positioned between the rib and the cooling chamber, wherein the impingement panel includes a plurality of impingement holes fluidly coupling the cooling chamber to the plurality of inlet passages of the cooling circuit.

Another aspect of the disclosure provides any of the preceding aspects, and wherein the impingement panel extends between a first hook and a second hook extending outward from the body.

Another aspect of the disclosure provides any of the preceding aspects, and further comprising an intermediate component disposed between the body and the turbomachine casing, and wherein the first hook and the second hook engage respective recesses in the intermediate component.

Another aspect of the disclosure provides any of the preceding aspects, and the first hook and the second hook are configured to engage respective recesses in the turbomachine casing.

Another aspect of the disclosure provides any of the preceding aspects, and wherein the cooling circuit further includes at least two second plenums fluidly coupled to the first plenum and within different structural members of the body, wherein the at least two second plenums fluidly couple the respective first plenums to the outlet passages.

Another aspect of the disclosure provides any of the preceding aspects, and one of the at least two second plenums is defined in the first sidewall, and one of the at least two second plenums is defined in the second sidewall.

Another aspect of the disclosure provides any of the preceding aspects, and one of the at least two second plenums is defined in the first sidewall and the aft end, and one of the at least two second plenums is defined in the second sidewall and the aft end.

Another aspect of the disclosure provides any of the preceding aspects, and one of the at least two second plenums is defined in the first sidewall and the forward end, and one of the at least two second plenums is defined in the second sidewall and the forward end.

Another aspect of the disclosure provides any of the preceding aspects, and the first plenum is one of at least two first plenums extending within the rib of the body, and the cooling circuit includes at least two second plenums fluidly coupled to respective first plenums and within different structural members of the body, wherein the at least two second plenums fluidly couple the respective first plenums to outlet passages defined in the first sidewall and second sidewall.

Another aspect of the disclosure provides any of the preceding aspects, and the plurality of inlet passages are shaped to direct a cooling air into the first plenum and toward an underside surface of the rib.

Another aspect of the disclosure provides a turbomachine comprising: a blade structure configured to rotate about a rotation axis of a rotor; and a turbine shroud oriented toward the blade structure and coupled to a turbomachine casing, the turbine shroud including: a body configured for coupling to a turbomachine casing, the body including a rib thereon and a forward end positioned opposite an aft end, wherein the rib is on a radially outward surface of the body, the rib extending from a first sidewall extending between the forward end and the aft end to a second sidewall extending between the forward end and the aft end opposite the first sidewall; and a cooling circuit within the body and in fluid communication with a cooling chamber defined radially outward of the body, the cooling circuit including: a plurality of inlet passages extending through the rib of the body and spaced along a length thereof, and a plurality of outlet passages fluidly coupled to the inlet passages and extending through an external surface of the body, at least one first plenum extending within the rib and in fluid communication with the plurality of inlet passages, and at least one second plenum fluidly coupled to the first plenum and within a different structural member of the body, wherein the second plenum fluidly couples the first plenum to the plurality of outlet passages.

Another aspect of the disclosure provides any of the preceding aspects, and further comprising an impingement panel positioned between the rib of the body and the cooling chamber, wherein the impingement panel includes a plurality of impingement holes fluidly coupling the cooling chamber to the plurality of inlet passages of the cooling circuit.

Another aspect of the disclosure provides any of the preceding aspects, and the cooling circuit further includes at least two second plenums fluidly coupled to respective first plenums and within different structural members of the body, wherein the at least two second plenums fluidly couple the respective first plenums to the outlet passages.

Another aspect of the disclosure provides any of the preceding aspects, and one of the at least two second plenums is defined in the first sidewall, and one of the at least two second plenums is defined in the second sidewall.

Another aspect of the disclosure provides any of the preceding aspects, and one of the at least two second plenums is defined in the first sidewall and the aft end, and one of the at least two second plenums is defined in the second sidewall and the aft end.

Another aspect of the disclosure provides any of the preceding aspects, and one of the at least two second plenums is defined in the first sidewall and the forward end, and one of the at least two second plenums is defined in the second sidewall and the forward end.

Another aspect of the disclosure provides a turbine shroud comprising: a body configured for coupling to a turbomachine casing, the body including a rib thereon and a forward end positioned opposite an aft end, wherein the rib is on a radially outward surface of the body, the rib extending from a first sidewall extending between the forward end and the aft end to a second sidewall extending between the forward end and the aft end opposite the first sidewall; and a cooling circuit within the body and in fluid communication with a cooling chamber defined radially outward of the body, the cooling circuit including: a plurality of inlet passages extending through the rib of the body and spaced along a length thereof, a plurality of outlet passages fluidly coupled to the inlet passages and extending through an external surface of the body, and a first plenum extending within the rib of the body and in fluid communication with the plurality of inlet passages, wherein the plurality of inlet passages are shaped to direct a cooling air into the first plenum and toward an underside surface of the rib.

Another aspect of the disclosure provides any of the preceding aspects, and the cooling circuit further includes at least two second plenums fluidly coupled to the first plenum and within different structural members of the body, wherein the at least two second plenums fluidly couple the respective first plenums to the outlet passages.

Another aspect of the disclosure provides any of the preceding aspects, and one of the at least two second plenums is defined in the first sidewall, and one of the at least two second plenums is defined in the second sidewall.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 1 shows a schematic diagram of a gas turbine system, according to embodiments of the disclosure.

FIGS. 2A and 2B show side views of a portion of a turbine of the gas turbine system of FIG. 1 according to different example configurations.

FIG. 4 shows a top view of an inner shroud according to some embodiments of the disclosure.

FIGS. 21 and 22 show top views of a turbine shroud according to another embodiment of the disclosure.

FIGS. 23A, 23B, 23C, 23D, and 23E illustrate cross-sectional side views of several non-limiting embodiments of collection plenums, according to various embodiments of the disclosure.

Figure 2B:
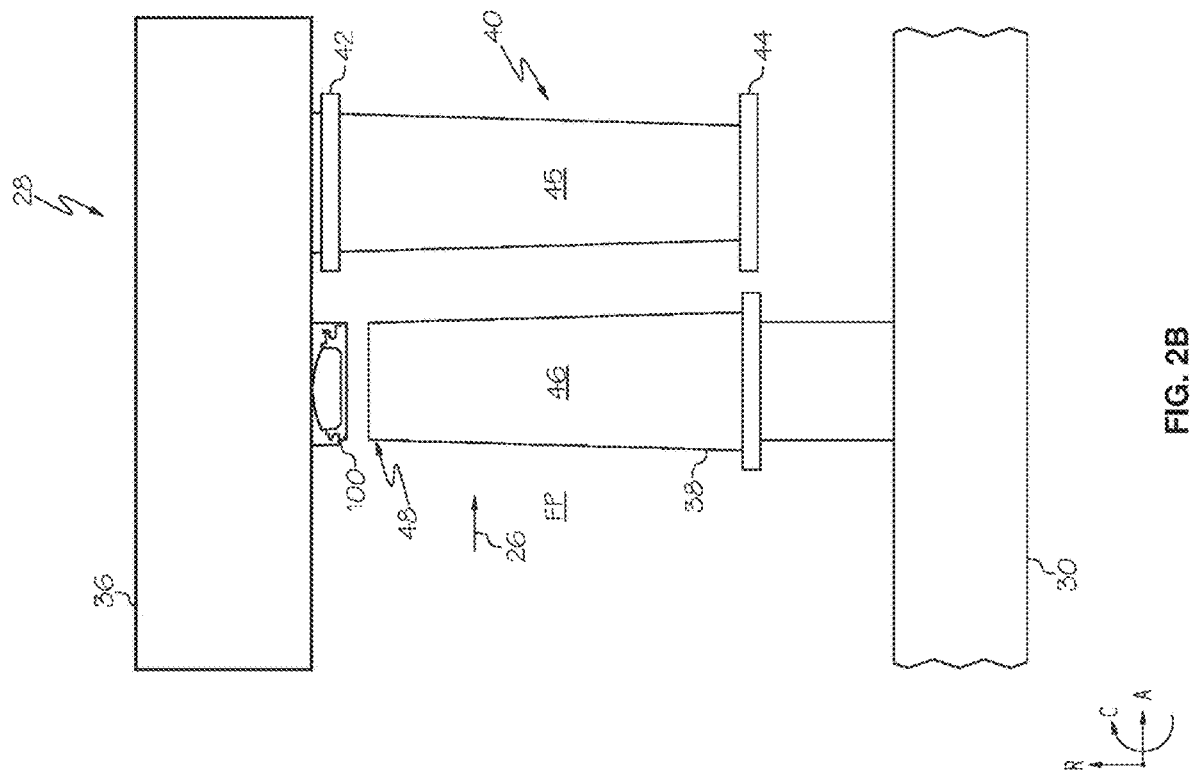

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through a combustor of the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

The term "axial" refers to movement or position parallel to an axis, e.g., an axis of a combustor or turbomachine. The term "radial" refers to movement or position perpendicular to an axis, e.g., an axis of a combustor or a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a combustion liner or a circumferential interior of casing extending about a turbine section. As indicated above and depending on context, it will be appreciated that such terms may be applied in relation to the axis of the combustor or the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur, or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Embodiments of the disclosure provide turbine shrouds for turbine systems and, more particularly, turbine shrouds that include a plurality of conduits in fluid communication with a multi-stage plenum formed therein. These and other embodiments are discussed herein with reference to FIGS. 1-25. However, it will be readily appreciated by those skilled in the art that the detailed description provided herein is for explanatory purposes and non-limiting.

FIG. 1 shows a schematic view of an illustrative gas turbine system 10. Gas turbine system 10 may include a compressor 12 which compresses an incoming flow of air 18 and delivers a flow of compressed air 20 to at least one combustor 22 of gas turbine system 10. Combustor 22 mixes the flow of compressed air 20 with a pressurized flow of fuel 24 and ignites the mixture to create a flow of combustion gases 26. In turn, flow of combustion gases 26 is typically delivered to a turbine 28 (e.g., an expansion turbine) including a plurality of turbine blades having one or more airfoils (see FIG. 2), which are driven by flow of combustion gases 26 to produce mechanical work. This mechanical work in turn drives compressor 12 via a rotor 30 extending through turbine 28 and may be used to drive an external load 32, such as an electrical generator and/or the like.

Gas turbine system 10 may further include an exhaust frame 34 that is positioned adjacent to (that is, downstream of) turbine 28 of gas turbine system 10 and that is positioned to receive the flow of combustion gases 26 after the expansion of the same within turbine 28. As discussed herein, a portion (e.g., outer casing) of exhaust frame 34 may be coupled directly to an enclosure, shell, or a casing 36 of turbine 28.

Subsequent to combustion gases 26 flowing through and driving turbine 28, combustion gases 26 may be exhausted and/or discharged through exhaust frame 34 in a flow direction (D). In the non-limiting example shown in FIG. 1, combustion gases 26 may flow through exhaust frame 34 in the flow direction (D) and may be discharged from gas turbine system 10 (e.g., to the atmosphere). In another non-limiting example where gas turbine system 10 is part of a combined cycle power plant (e.g., including gas turbine system 10 and a steam turbine system), combustion gases 26 may discharge from exhaust frame 34 and may flow in the flow direction (D) into a heat recovery steam generator of the combined cycle power plant.

Turning to FIGS. 2A and 2B, a portion of turbine 28 is shown in alternative configurations. FIGS. 2A and 2B each show a side view of a portion of turbine 28 including turbine blades 38 (one shown) coupled to rotor 30 and stator vanes 40 (one shown) coupled to casing 36 of turbine 28. As discussed herein, turbine blades 38 and stator vanes 40 may be arranged in multiple stages, e.g., a first stage, a second stage, a third stage. Each stage may include a plurality of turbine blades 38 that may be coupled to and positioned circumferentially around rotor 30 and may be driven by combustion gases 26 to rotate rotor 30. Similarly, each stage may include a plurality of stator vanes 40 that may be coupled to and positioned circumferentially about casing 36 of turbine 28. In the non-limiting example herein, stator vanes 40 may include an outer platform 42 positioned adjacent and/or coupling stator vanes 40 to casing 36 of turbine 28, an inner platform 44 positioned opposite the outer platform 42, and an airfoil 45 positioned between outer platform 42 and inner platform 44. Outer platform 42 and inner platform 44 of stator vanes 40 may define a flow path (FP) for the combustion gases 26 flowing over stator vanes 40.

Each turbine blade 38 of turbine 28 may include an airfoil 46 extending radially from rotor 30 and positioned within the flow path (FP) of combustion gases 26 flowing through turbine 28. Each airfoil 46 may include a tip portion 48 positioned radially opposite rotor 30. Turbine blades 38 and stator vanes 40 may also be positioned axially adjacent to one another within casing 36. In the non-limiting example shown in FIG. 2, stator vanes 40 may be positioned axially adjacent and downstream of turbine blades 38. Some turbine blades 38, stator vanes 40 and/or portions of rotor 30 of turbine 28 are omitted for clarity of illustration. Additionally, although only a portion of the of turbine blades 38 and stator vanes 40 of turbine 28 are shown in FIG. 2, turbine 28 may include a plurality of stages of turbine blades and stator vanes, positioned axially throughout casing 36 of turbine 28.

Turbine 28 of gas turbine system 10 (see FIG. 1) may also include a plurality of turbine shrouds 100. For example, turbine 28 may include a circumferential array of turbine shrouds 100 (one shown). Turbine shrouds 100 may correspond with turbine blades 38 and/or stator vanes 40. That is, and as discussed herein, turbine shrouds 100 may be positioned within turbine 28 adjacent (i.e., radially outward of) turbine blades 38 and/or stator vanes 40 to interact with and provide a seal in the flow path (FP) of combustion gases 26 flowing through turbine 28. In the non-limiting example shown in FIG. 2, turbine shrouds 100 may be positioned radially adjacent turbine blades 38 and/or may substantially surround or encircle turbine blades 38. Turbine shrouds 100 may be positioned radially adjacent tip portion 48 of airfoil 46 for turbine blade 38. Additionally, turbine shrouds 100 may also be positioned axially adjacent and/or upstream of the stator vanes 40 of turbine 28 (i.e., between turbine blades 38 and stator vanes 40).

Similar to stator vanes 40, turbine shrouds 100 may include a plurality of turbine shrouds 100, each of which may be coupled to and positioned circumferentially about casing 36 of turbine 28. In one example shown in FIG. 2A, turbine shrouds 100 may be coupled to casing 36 via coupling component 50 extending radially inward from casing 36 of turbine 28. Coupling component 50 may be configured to be coupled to and/or receive fasteners or hooks of turbine shrouds 100 to couple, position, and/or secure turbine shrouds 100 to casing 36 of turbine 28. In the FIG. 2A example, coupling component 50 may be coupled and/or fixed to casing 36 of turbine 28. In another example shown in FIG. 2B, coupling component 50 (FIG. 2A) is omitted, and turbine shroud 100 is directly coupled to casing 36. Similar to turbine blades 38 and/or stator vanes 40, although only a portion of turbine shrouds 100 of turbine 28 is shown in FIG. 2, turbine 28 may include a plurality of stages of turbine shrouds 100, positioned axially throughout casing 36 of turbine 28.

Additional details related to turbine shrouds and gas turbine systems, generally, can be found in U.S. Pat. No. 10,837,315 B2 (application Ser. No. 16/170,331), the entirety of which is incorporated by reference herein.

Figure 3A:
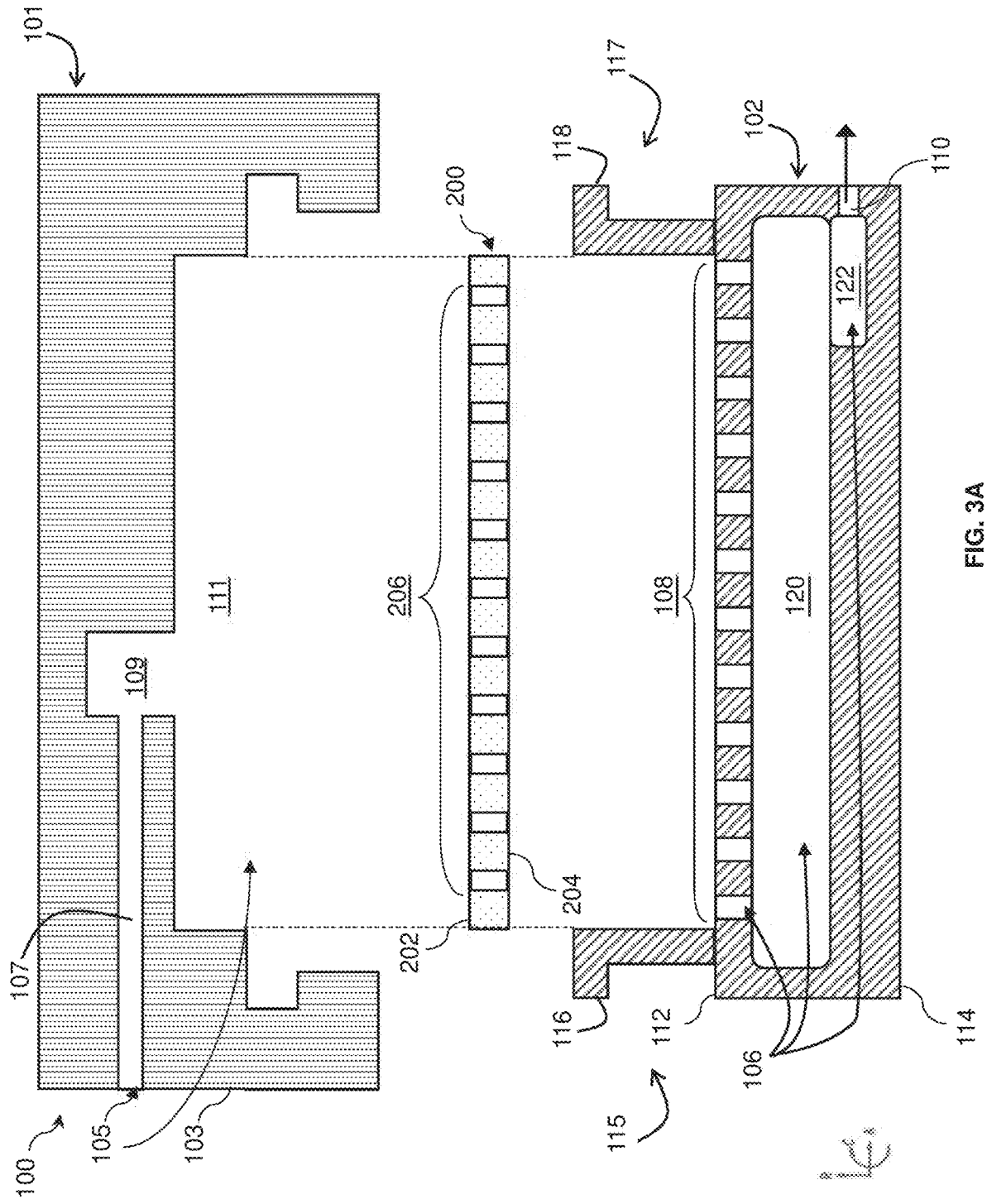
FIGS. 3A and 3B show exploded and assembled cross-section side views of an outer shroud, an inner shroud, and an impingement panel of a turbine shroud according to embodiments of the disclosure.
Figure 3B:
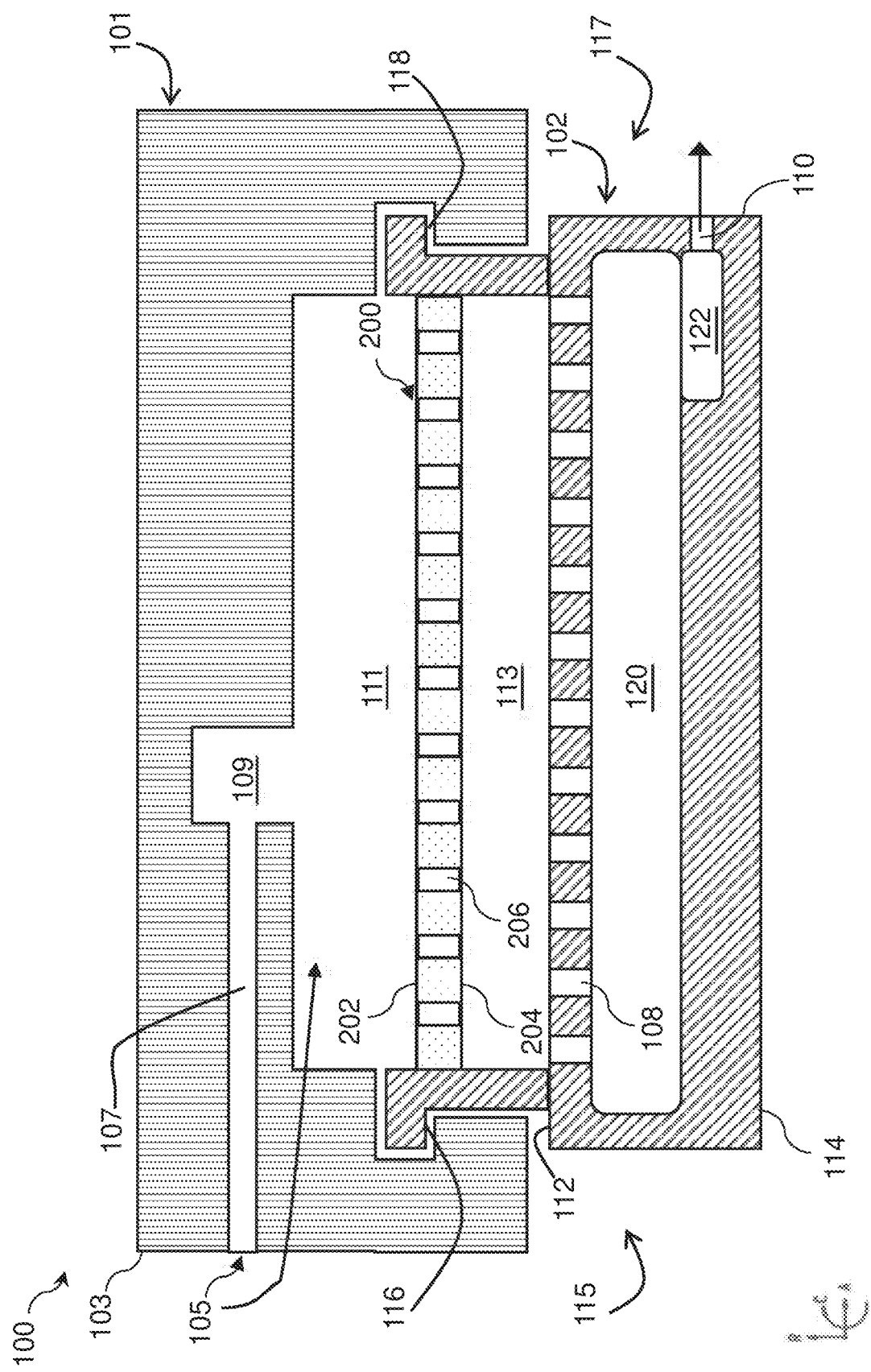

FIGS. 3A and 3B show exploded cross-section and assembled cross-section views, respectively, of turbine shroud 100 according to embodiments of the present disclosure. As shown, turbine shroud 100 includes a body 102 coupled to an intermediate component 101. Turbine shroud 100 further may include an impingement panel 200 coupled to body 102, e.g., such that impingement panel 200 is between body 102 and intermediate component 101. Turbine shroud 100 may include various cooling circuits extending within body 102, intermediate component 101, and/or impingement panel 200.

As shown, intermediate component 101 includes a component body 103. Component body 103 may be configured to be coupled with body 102 such as by one or more mechanical fasteners or hooks. Component body 103 may be coupled to casing 36 (FIG. 2A). During operation, component body 103 may be in fluid communication with a cooling fluid (e.g., air, coolant, etc.) and thereby transmits the cooling fluid to body 102 of turbine shroud 100. For example, as further shown in FIG. 3A, component body 103 includes a component cooling circuit 105 extending therein. Component cooling circuit 105 includes an inlet passage 107 extending through one or more exterior surfaces of intermediate component 101 (e.g., feed holes). Inlet passage 107 may be oriented axially, or substantially axially, with respect to a rotation axis of turbomachine. Component cooling circuit 105 includes an outlet passage 109 in fluid communication with inlet passage 107. Outlet passage 109 may be oriented in any direction, e.g., radially inward with respect to the rotation axis. As further shown, outlet passage 109 includes a portion adjacent to body 102 which defines a cooling chamber 111 adjacent body 102 of turbine shroud 100. During operation, cooling fluid (e.g., compressed air 20 (FIG. 1) from compressor 12 (FIG. 1) of gas turbine system 10 (FIG. 1)) flows through inlet passage 107 of component cooling circuit 105 and into cooling chamber 111. As further discussed herein, cooling fluid may collect within cooling chamber 111, which in turn flows through impingement panel 200, and in turn through a cooling circuit 106 extending within body 102.

Figure 3C:
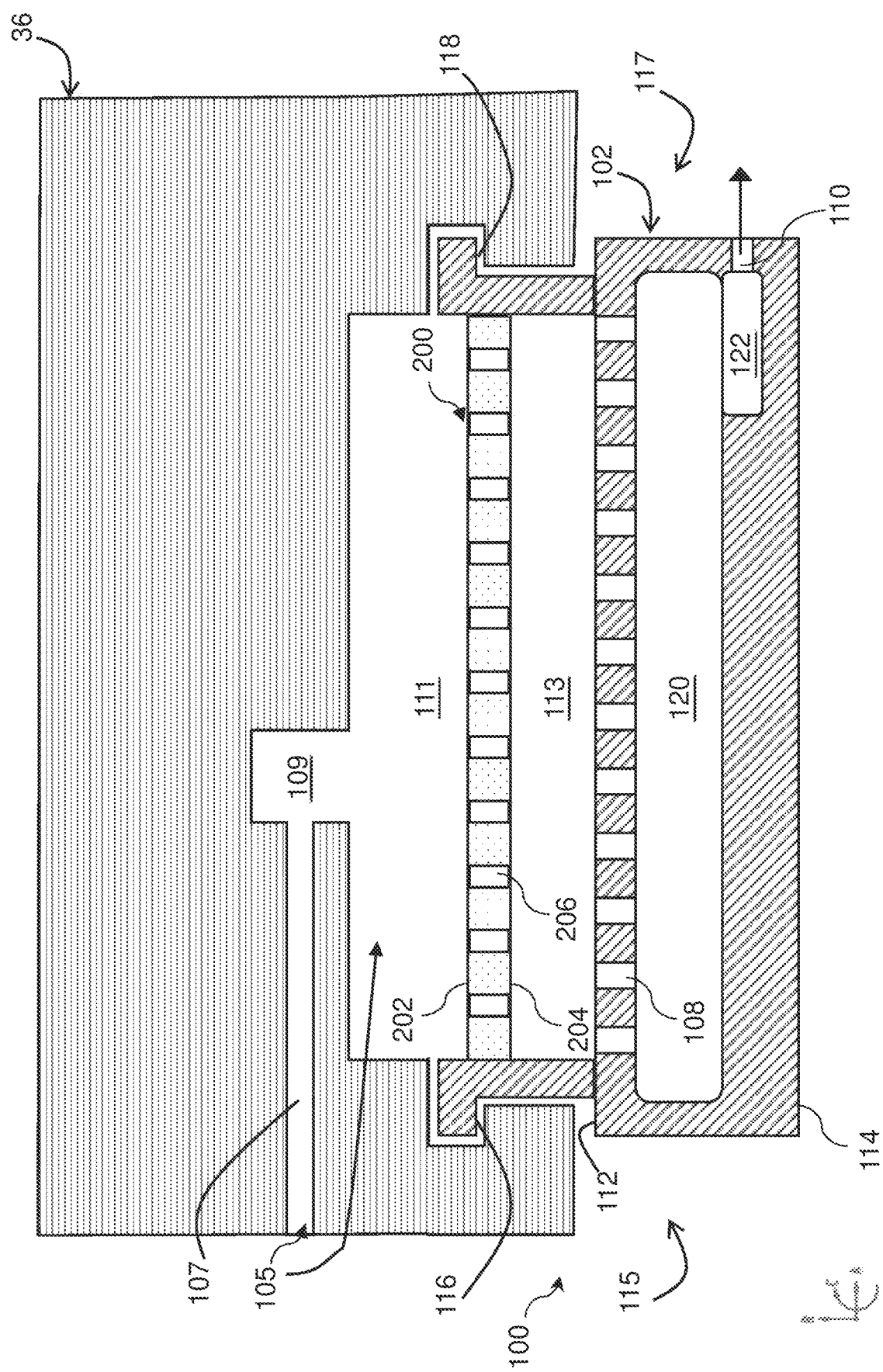
FIG. 3C shows a cross-section side view of an outer shroud, an inner shroud, and an impingement panel of a turbine shroud according to further embodiments of the disclosure.

FIG. 3C depicts a further example where body 102 and/or impingement panel 200 are coupled directly to casing 36 having inlet passage 107, outlet passage 109, and/or cooling chamber 111 defined at least partially therein. In this case, intermediate component 101 may be omitted entirely because body 102 is coupled directly to an internal portion of casing 36 via one or more fasteners, hooks, mechanical components, adhesives, etc. Regardless of whether intermediate component 101 is present, body 102 and portions thereof may be provided according to any embodiment discussed herein.

Referring to FIGS. 3A-3C together, turbine shroud 100 may extend axially between a forward end 115 and an aft end 117 and may extend circumferentially between a first sidewall 126 and a second sidewall 128. Forward end 115 may be positioned upstream of aft end 117, such that combustion gases 26 flowing through the flow path (FP) defined within turbine 28 may flow adjacent to forward end 115 before flowing by aft end 117 of turbine shroud 100.

During operation of gas turbine system 10, a cooling fluid (e.g., air, coolant) flows through one or more cooling circuits to dissipate heat from turbine shroud 100. As discussed herein, cooling fluid may flow through casing 36, intermediate component 101, impingement panel 200, body 102, and/or an exterior surface of body 102 of turbine shroud 100.

Optionally, impingement panel 200 may be coupled to body 102. In this case, impingement panel 200 may direct a cooling fluid (e.g., air) from cooling chamber 111 in discrete jets which impinge upon (or strike) body 102. As shown in FIG. 3A, impingement panel 200 may be spaced radially outward from a radially outer surface 112 of body 102 along the radial direction R. Impingement panel 200 may include a first surface 202 positioned opposite a second surface 204. First surface 202 and second surface 204 may be radially separated a distance which defines a radial thickness therebetween. First surface 202 may be configured to face toward casing 36 and/or intermediate component 101 to partially define cooling chamber 111. Second surface 204 may be configured to face body 102 to partially define an air chamber 113 therebetween. Air chamber 113 may be positioned radially between second surface 204 and body 102. Impingement panel 200 may extend axially and/or circumferentially between two or more surfaces of body 102 and/or intermediate component 101. For example, impingement panel 200 may extend between a pair of fasteners/hooks 116, 118 extending radially outward from body 102 relative to a rotation axis of turbomachine.

Impingement panel 200 may further include a plurality of impingement holes 206 extending radially through first surface 202 and second surface 204. Each impingement hole 206 may be sized and oriented to direct cooling fluid in discrete jets which impinge upon one or more surfaces of radially inner body 102 of turbine shroud 100. The discrete jets of air impinge (or strike) surfaces of inner body 102 of turbine shroud 100 and create a thin boundary layer of air over these surfaces, which increases heat transfer between turbine shroud 100 and the air. Each impingement hole 206 may include an inlet formed within first surface 202 and an outlet formed within second surface 204 of impingement panel 200. One or more outlets for plurality of impingement holes 206 may partially define air chamber 113.

Additional details related to impingement panels for gas turbine systems, generally, can be found in U.S. Pat. No. 11,371,702 B2 (U.S. application Ser. No. 17/007,068), the entirety of which is incorporated by reference herein.

During operation of gas turbine system 10, cooling fluid flows from cooling chamber 111 and through impingement panel 200 via plurality of impingement holes 206, which in turn impinges on body 102. After cooling fluid impinges on body 102, cooling fluid collects within air chamber 113, which in turn flows through a cooling circuit 106 of body 102 extending within body 102.

As further shown in FIG. 4, body 102 extends axially between forward end 115 and aft end 117. Body 102 may include various ends, sides, and/or surfaces. For example, body 102 may include first sidewall 126 extending opposite second sidewall 128. First sidewall 126 and/or second sidewall 128 may extend and/or be formed between forward end 115 and aft end 117. In some implementations, first sidewall 126 and/or second sidewall 128 may be substantially closed and/or may include solid end walls or caps. As such, during operation, solid end walls of first sidewall 126 and/or second sidewall 128 may substantially prevent fluid within turbine 28 (e.g., combustion gases 26, cooling fluids) from entering turbine shroud 100, and/or cooling fluid from exiting internal portions (e.g., passages, plenums) formed within turbine shroud 100 via first sidewall 126 and/or second sidewall 128. In other implementations, first sidewall 126 and/or second sidewall 128 include one or more outlet passages (e.g., one or more exhaust holes) extending through one or more exterior portions of turbine shroud 100. As such, during operation, cooling fluid exhausts from turbine shroud 100 via one or more exhaust holes formed therein, which in turn may cool one or more exterior portions of body 102 and/or surrounding components of gas turbine system 10.

Referring to FIGS. 3A, 3B, 3C, and 4 together, body 102 may further include one or more fasteners/hooks extending radially outward from one or more exterior portions thereof. For example, body 102 may include a first hook 116 positioned at the forward end 115 and a second hook 118 positioned at the aft end 117. First hook 116 and/or second hook 118 may be configured to be coupled to and/or engage casing 36 or intermediate component 101 to couple, position, and/or secure body 102 with casing 36 or intermediate component 101. As shown, first hook 116 and second hook 118 extend radially outward from an outer surface 112 of body 102. In an example embodiment, first hook 116 may be oriented toward a forward axial direction, while second hook 118 may be oriented toward an aft axial direction. Other orientations may be possible.

Body 102 may further include various structural members on its outer surface. As used herein, the term "structural member" refers to any load bearing component of turbine shroud 100 and/or body 102 for structurally supporting and/or otherwise mechanically engaging other portions of a turbomachine structure. In various examples, a structural member may include one or more ribs on various surfaces of body 102, sidewalls of body 102 for structurally supporting adjacent components and/or other components coupled to body 102, mechanical fastening elements (e.g., hooks 116, 118 discussed herein) and/or other mechanical members for coupling body 102 to other components such as intermediate component 101 and/or casing 36. The example of a rib 124, as shown in FIGS. 4-23, is used herein to discuss features and/or subcomponents formed within a structural member, but it is understood that any references to rib 124 may be substituted for any or all types of structural members in various further embodiments. Structural members, e.g., rib(s) 124, may form part of and/or may be positioned on outer surface 112. Rib 124, as discussed, may structurally support body 102 against shroud deflection during the operation of a turbine machine. However, the presence of rib 124 or other structural members also creates additional mass that may experience significant heat transfer during operation.

Embodiments of the disclosure include features to cool body 102 and interconnected components via rib 124 (or other structural members), while maintaining the presence and structural advantages of rib 124 (or other structural members) in body 102. Rib 124, or any other structural member, may protrude radially outward from outer surface 112. In some implementations, as shown in FIGS. 4-17, rib 124 may extend axially between forward end 115 and aft end 117. In other implementations, as shown in FIGS. 18-23, rib 124 may extend circumferentially between first sidewall 126 and second sidewall 128. In some implementations, inner body 124 includes a plurality of ribs 124 positioned on outer surface 112. Plurality of ribs 124 may extend circumferentially and/or axially along outer surface 112. For example, in the top-down view of body 102 of turbine shroud 100 as shown in FIG. 4, body 102 includes multiple structural members in the form of multiple ribs 124 positioned on outer surface 112, respectively extending axially between first hook 116 and second hook 118.

Outer surface 112 may be formed and/or positioned between forward end 115 and aft end 117, as well as first sidewall 126 and second sidewall 128, respectively. During operation, outer surface 112 may be positioned, formed, facing, and/or otherwise in fluid communication with cooling chamber 111 formed between body 102 and casing 36 or intermediate component 101. As discussed herein, cooling chamber 111 may receive and/or provide cooling fluid to turbine shroud 100 during operation of turbine 28. For example, body 102 may include a cooling circuit 106 extending within body 102 and in fluid communication with cooling chamber 111.

As shown in FIGS. 3A-3C, turbine shroud 100 includes cooling circuit 106 which may include an inlet passage 108 extending through outer surface 112, and fluidly connected to an outlet passage 110 extending through one or more exterior surfaces of body 102. Inlet passage 108 may extend in a predetermined direction (e.g., radially or substantially radially) through rib 124 (or other structural members) of body 102 (e.g., in the same direction as radial direction R, e.g., rotation axis of turbomachine). Outlet passage 110 may extend in a predetermined direction (e.g., axially, or substantially axially) through one or more external surfaces of body 102. During operation, cooling fluid flows through inlet passage 108, through one or more plenums 120, 122 of cooling circuit 106, and exhausts through outlet passage 110. While the inlet passage 108 and the outlet passage 110 are introduced above as singular items, it should be appreciated that a plurality of inlet passages 108 and a plurality of outlet passages 110 may be used. The plurality of inlet passages 108 may be different in number from the plurality of outlet passages 110.

Turning now to FIG. 4, illustrating a top-down view of body 102 of turbine shroud 100 according to some embodiments of the present disclosure. Portions of body 102 extend between forward end 115 and aft end 117, as discussed above with reference to FIGS. 1, 2, 3A, 3B, and 3C, duplicative details of which are omitted with reference to FIGS. 4-22 for brevity. Body 102 includes cooling circuit 106 (FIGS. 5-7) including inlet passages 108 extending axially between forward end 115 and aft end 117 and extending radially through outer surface 112.

Figure 5:
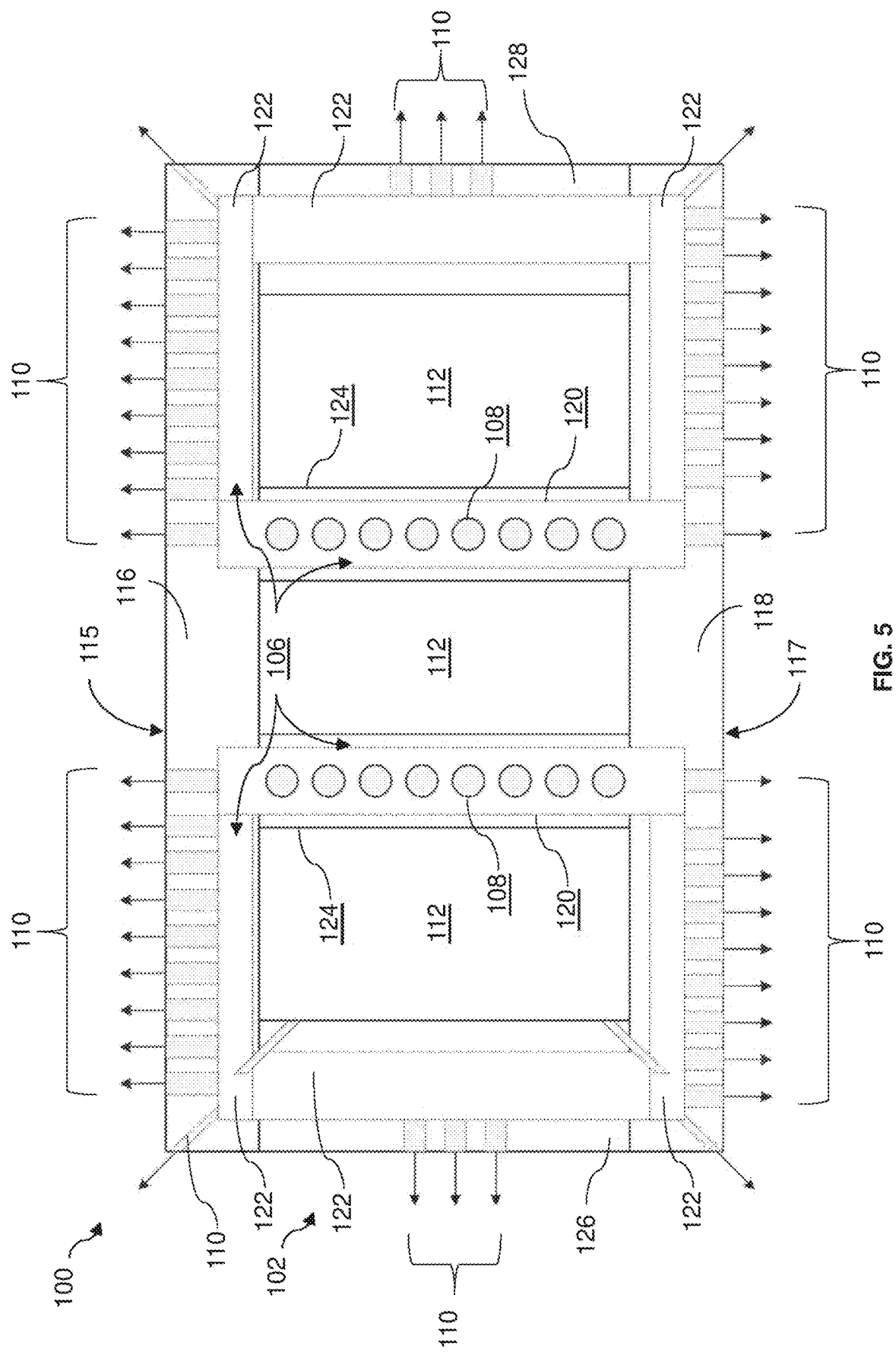
FIGS. 5-7 show various cross-section top views of the inner shroud of FIG. 4 including various cooling circuit configurations, according to embodiments of the disclosure.
Figure 6:
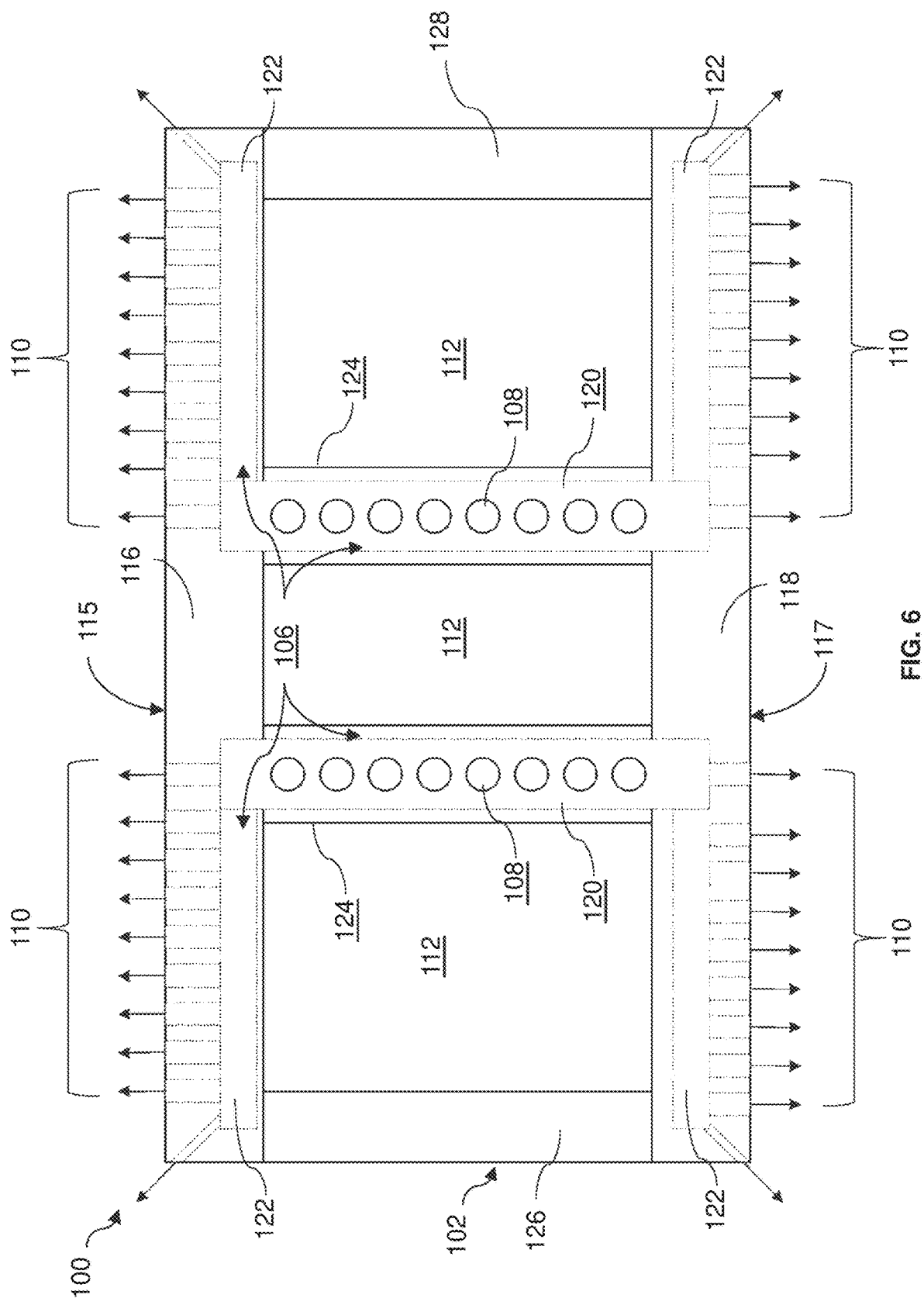
Figure 7:
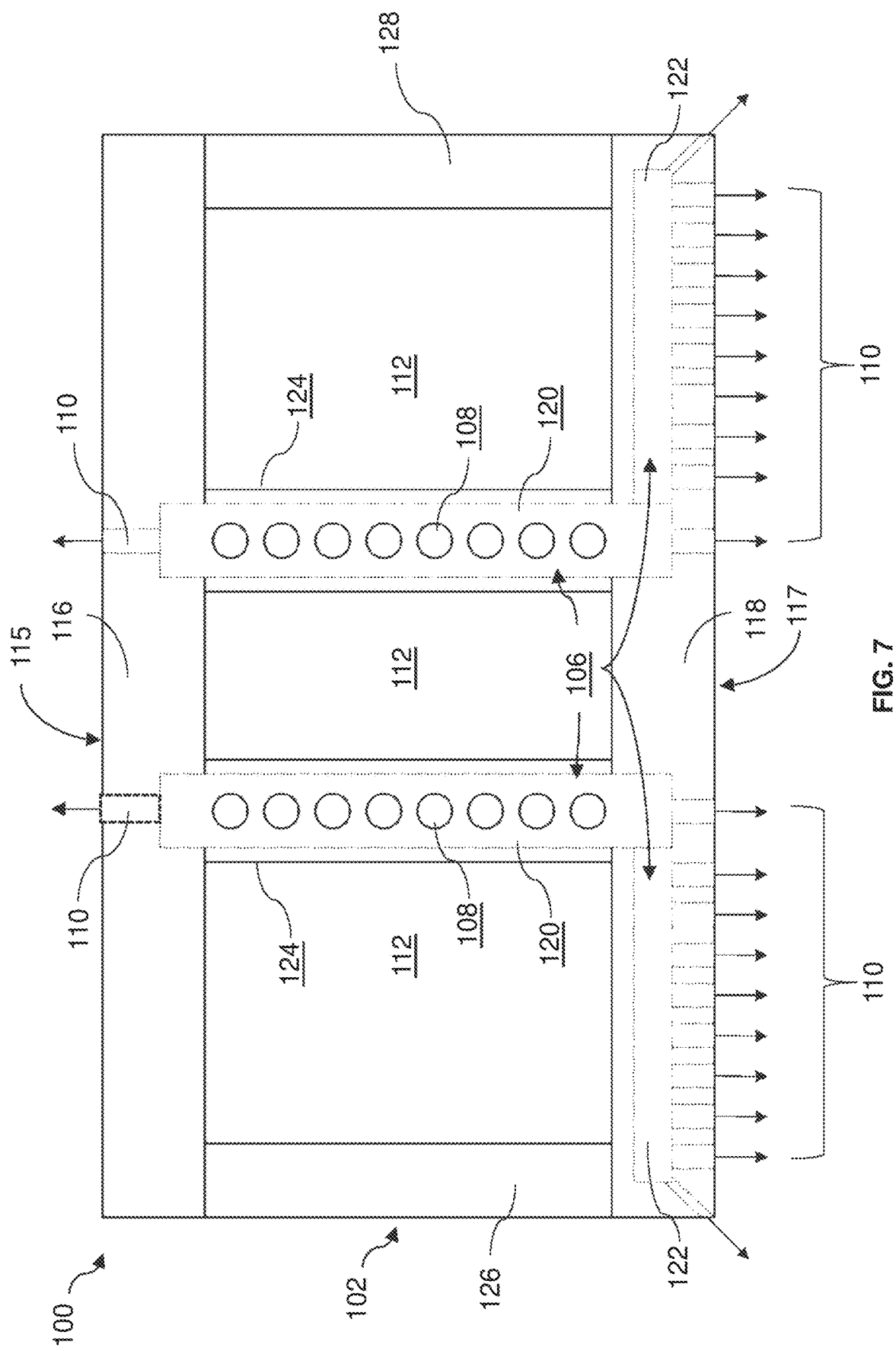

FIGS. 5-7 illustrate various configurations of cooling circuit 106 for body 102 of FIG. 4, according to some embodiments of the disclosure.

FIG. 5 shows a cross-section top-down view of cooling circuit 106 according to further embodiments. Inlet passages 108 are in fluid communication with a first plenum 120 extending within a respective structural member. According to an example, first plenum(s) 120 may be "rib plenums" in which each plenum 120 extends within one rib 124. As shown, cooling circuit 106 includes inlet passages 108 extending through one of first rib 124 and second rib 124, extending into a respective first plenum 120. Inlet passages 108 may extend radially, or substantially radially, through rib(s) 124 (or other structural members) into body 102. During operation, cooling fluid flows from cooling chamber 111, through impingement panel 200, through inlet passages 108, and into plenum 120. Cooling fluid from first plenum 120 flows into one or more second plenums 122 extending within body 102. Each second plenum 122 may be defined within another structural element of body 102 (that is, within a structure other than ribs 124). For instance, second plenums 122 are shown as being defined within hook(s) 116, 118. In further implementations, second plenum(s) 122 may be within various structural elements other than rib(s) 124.

In some embodiments, cooling circuit 106 includes one or more second plenums 122 in fluid communication with first plenum 120. Within cooling circuit 106, one or more inlets may be formed in fluid communication with first plenum(s) 120, and one or more outlets may be formed in fluid communication with one or more second plenums 122. As shown, second plenums 122 are fluidly coupled between outlet passages 110 and one or more first plenums 120 extending within rib 124 (or other structural members). In some embodiments, for example, second plenum 122 extends partially within at least one of a leading edge (i.e., an edge of body 102 facing toward incoming working fluid flow) or a trailing edge (i.e., an edge of body 102 facing away from incoming working fluid flow) of body 102, first sidewall 126, and second sidewall 128, etc. In some implementations, cooling circuit 106 includes one or more collection plenums extending in a predetermined direction (e.g., circumferentially relative to the rotor axis) within body 102.

In some embodiments, cooling fluids may flow through and/or be exhausted from one or more exhaust holes in one or more outer surfaces of turbine shroud 100. It should be understood that the formation and/or position of exhaust holes in turbine shroud 100 is illustrative and non-limiting. Exhaust holes, which may be formed in or through various portions of turbine shroud 100, define the terminal end of outlet passages 110. Cooling fluid may discharge through one or more exhaust holes and pass into a space formed between circumferentially adjacent turbine shrouds 100 and/or used for cooling circumferentially adjacent turbine shrouds 100, or other axially adjacent turbine components.

As further shown in FIG. 5, outlet passage 110 may be defined partially within, and thus extend through, an edge of body 102. For example, as shown in FIG. 5, outlet passage 110 may include a plurality of outlet passages 110 defined partially within various edges, and/or extending through various surfaces, of body 102. Arrows indicate the flow of cooling air exhausted from body 102 via outlet passages 110.

In some embodiments, cooling circuit 106 includes outlet passages defined partially within a leading edge at forward end 115, such that outlet passages 110 extend through a leading edge surface of body 102. Cooling circuit 106 further includes outlet passages 110 defined partially within a trailing edge at aft end 117, such that outlet passages 110 extend through a trailing edge surface of body 102. Cooling circuit 106 further includes outlet passages 110 defined partially within first sidewall 126 and second sidewall 128, such that outlet passages 110 extend through respective sidewall surfaces of body 102.

FIGS. 6 and 7 respectively illustrate cross-section views for different embodiments of body 102 of FIG. 4. Body 102 as shown in FIGS. 6 and 7 is substantially similar to body 102, except for a different configuration of cooling circuit 106 extending therein.

FIG. 6 shows cooling circuit 106 including second plenums 122 extending proximate to forward end 115 beneath first hook 116, and second plenums 122 extending proximate to aft end 117 beneath second hook 118. In contrast to body 102 of FIG. 5, body 102 of FIG. 6 does not include plenums 122 extending within or along first sidewall 126 or second sidewall 128.

FIG. 7 shows cooling circuit 106 including second plenums 122 extending proximate to aft end 117 beneath second hook 118. Cooling circuit 106 further includes outlet passages 110 fluidly coupling ribs 124 (or other structural members) with leading edge surface at forward end 115. In contrast to inner shrouds 102 of FIGS. 5 and 6, body 102 of FIG. 7 does not include second plenums 122 extending within or along first sidewall 126 or second sidewall 128, or beneath first hook 116.

Figure 8:
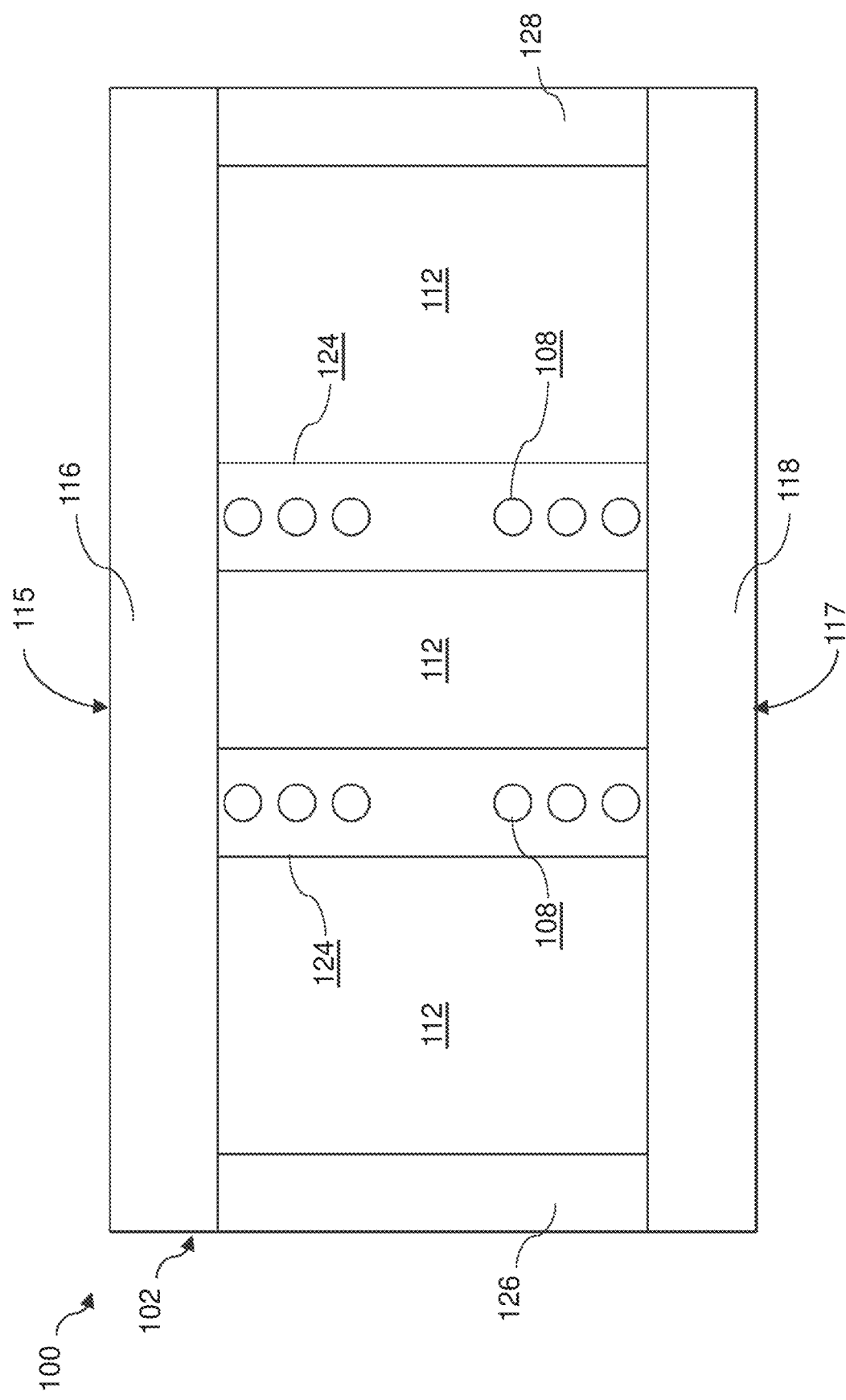
FIG. 8 shows a top view of a turbine shroud according to embodiments of the disclosure.
Figure 9:
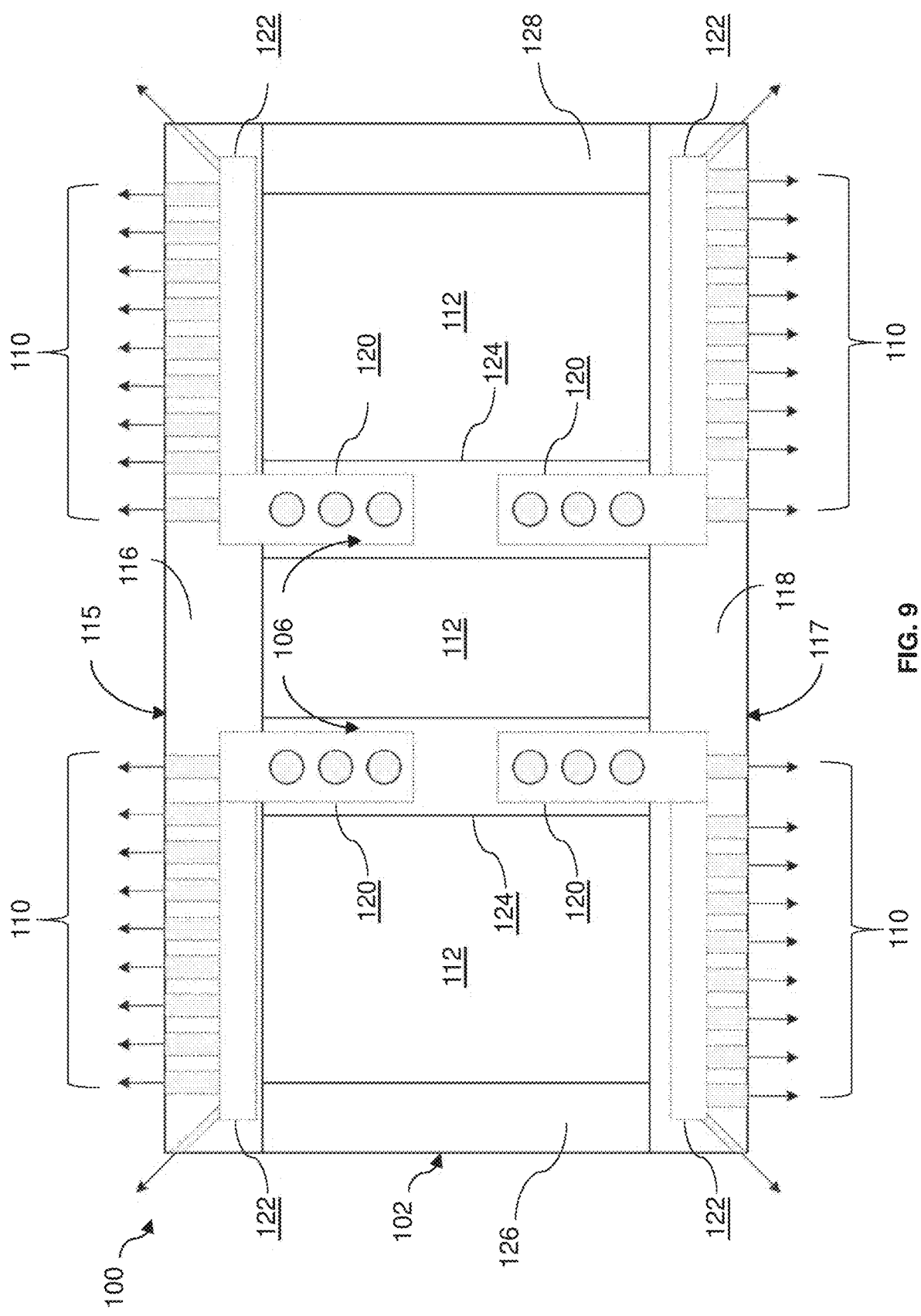
FIG. 9 shows a cross-section top view of the turbine shroud of FIG. 8 according to embodiments of the disclosure.

FIGS. 8 and 9 show various views of another non-limiting example of body 102 of turbine shroud 100 according to embodiments of the present disclosure. The non-limiting example of body 102 shown in FIGS. 8 and 9 may include similar features as discussed herein with respect to FIGS. 4-7, oriented and/or positioned in a distinct manner.

FIG. 8 shows a top view of turbine shroud 100 including body 102 extending axially between forward end 115 and aft end 117. Body 102 includes outer surface 112 extending between first sidewall 126 and second sidewall 128 and positioned opposite inner surface 114 configured to face the hot gas flow path (FP, FIGS. 2A and 2B) of gas turbine system 10 (see, FIGS. 3A and 3B). As shown, body 102 includes a pair of ribs 124 (optionally with other structural members) extending axially between forward end 115 and aft end 117. Inlet passages 108 of cooling circuit 106 include a first set of inlet passages 108 axially separated from a second set of inlet passages 108 (that is, a first set is proximate to forward end 115, and a second set is proximate to aft end 117).

FIG. 9 shows a cross-section top view of body 102 of FIG. 8. As shown, second circuit 106 includes four first plenums 120 extending within pair of ribs 124, and which are in fluid communication with cooling chamber 111 by inlet passages 108. Each plenum 120 of the four first plenums 120 shown in FIG. 9, is fluidly uncoupled from other first plenums 120 extending within body 102. In the present embodiment, each first plenum 120 is in fluid communication with a corresponding second plenum 122 extending beneath first hook 116 or second hook 118 where applicable. Outlet passages 110 are partially defined within body 102 proximate to forward end 115 or aft end 117, as previously discussed herein regarding FIGS. 4-7. During operation, cooling fluid flows from cooling chamber 111, through impingement panel 200, through inlet passages 108, through plenums 120, through plenums 122, and through outlet passages 110. It should be understood that alternative configurations for cooling circuit 106 are contemplated within the scope of the present disclosure.

Figure 10:
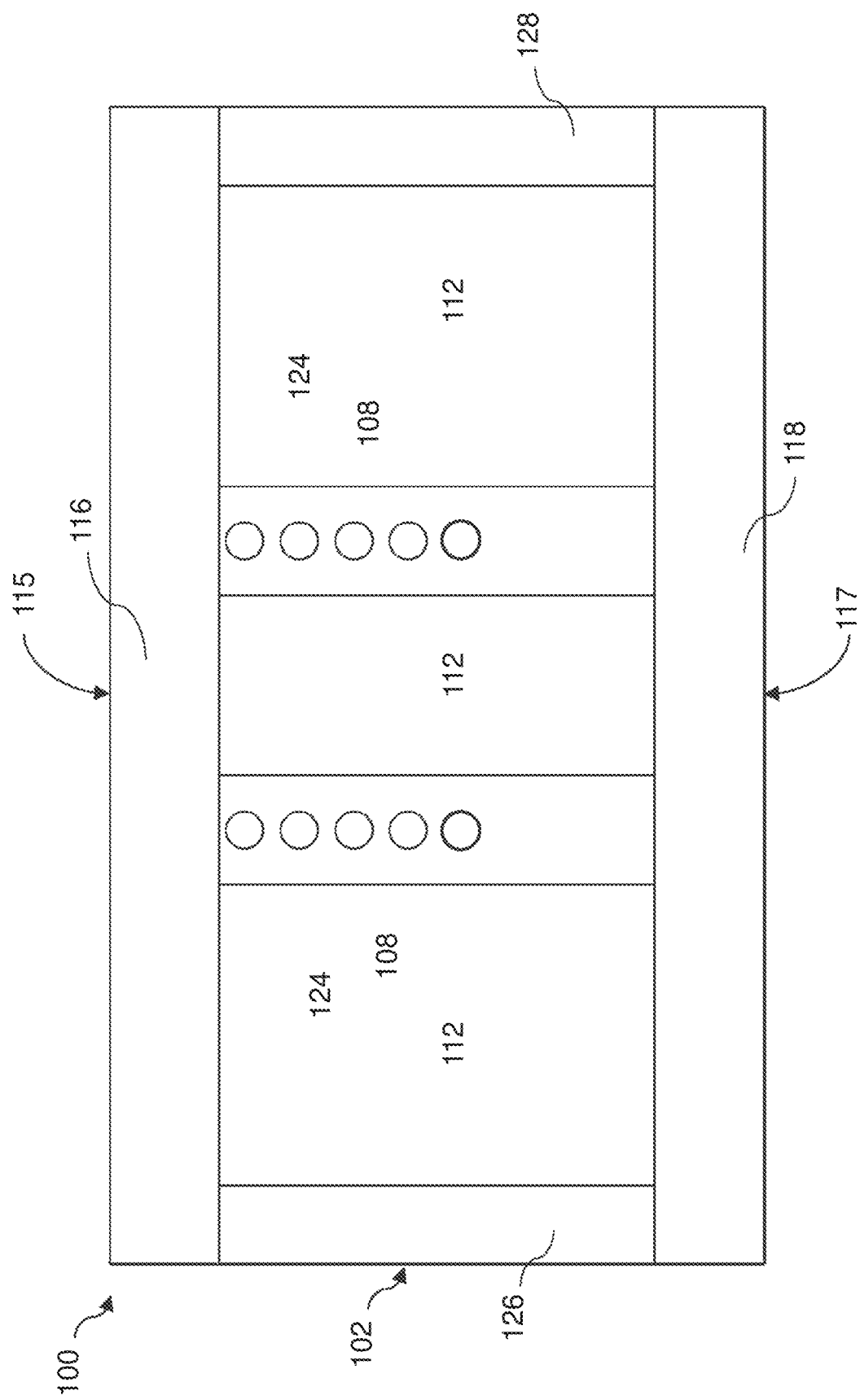
FIG. 10 shows a top view of a turbine shroud according to embodiments of the disclosure.
Figure 11:
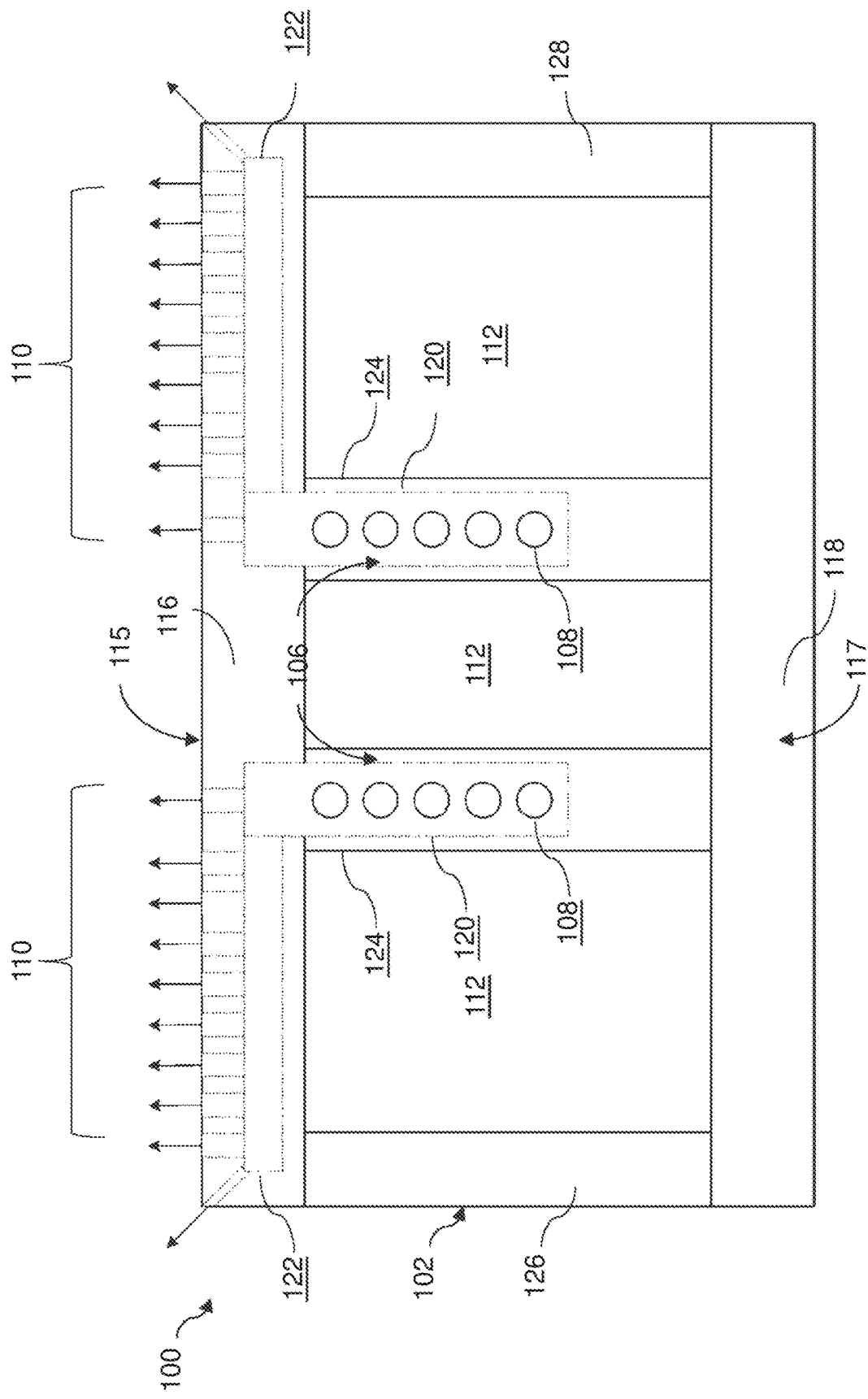
FIG. 11 shows a cross-section top view of the turbine shroud of FIG. 10 according to embodiments of the disclosure.

FIGS. 10 and 11 show various views of another non-limiting example of body 102 of turbine shroud 100 according to embodiments of the present disclosure. The non-limiting example of body 102 shown in FIGS. 10 and 11 may include similar features as discussed herein with respect to FIGS. 4-9, oriented and/or positioned in a distinct manner.

FIG. 10 shows a top view of turbine shroud 100 including body 102 extending between forward end 115 and aft end 117. Body 102 includes outer surface 112 extending between first sidewall 126 and second sidewall 128 and positioned opposite inner surface 114 configured to face the hot gas flow path for turbomachine (see, FIGS. 3A and 3B). As shown, body 102 includes a pair of ribs 124 extending axially between forward end 115 and aft end 117. Inlet passages 108 of cooling circuit 106 extend axially along, and radially through, a portion of rib 124.

FIG. 11 shows a cross-section top view of body 102 of FIG. 10. As shown, each rib 124 includes one first plenum 120 extending therein, between outer surface 112 and inner surface 114. Each first plenum 120 is respectively coupled with one second plenum 122 extending circumferentially within body 102 beneath first hook 116 proximate to leading edge at forward end 115. Each first plenum 120 is fluidly uncoupled with respect to the other first plenum 120, and each second plenum 122 is fluidly uncoupled with respect to the other second plenum 122. One or more outlet passages 110 are partially defined within body 102 proximate to forward end 115, as previously discussed herein regarding FIGS. 4-9. It should be understood that alternative configurations for cooling circuit 106 are contemplated within the scope of the present disclosure.

FIGS. 12-16 show various views of other non-limiting examples of body 102 of turbine shroud 100 according to embodiments of the present disclosure. The non-limiting examples of body 102 shown in FIGS. 12-16 may include similar features as discussed herein with respect to FIGS. 4-11, oriented and/or positioned in a distinct manner.

Figure 12:
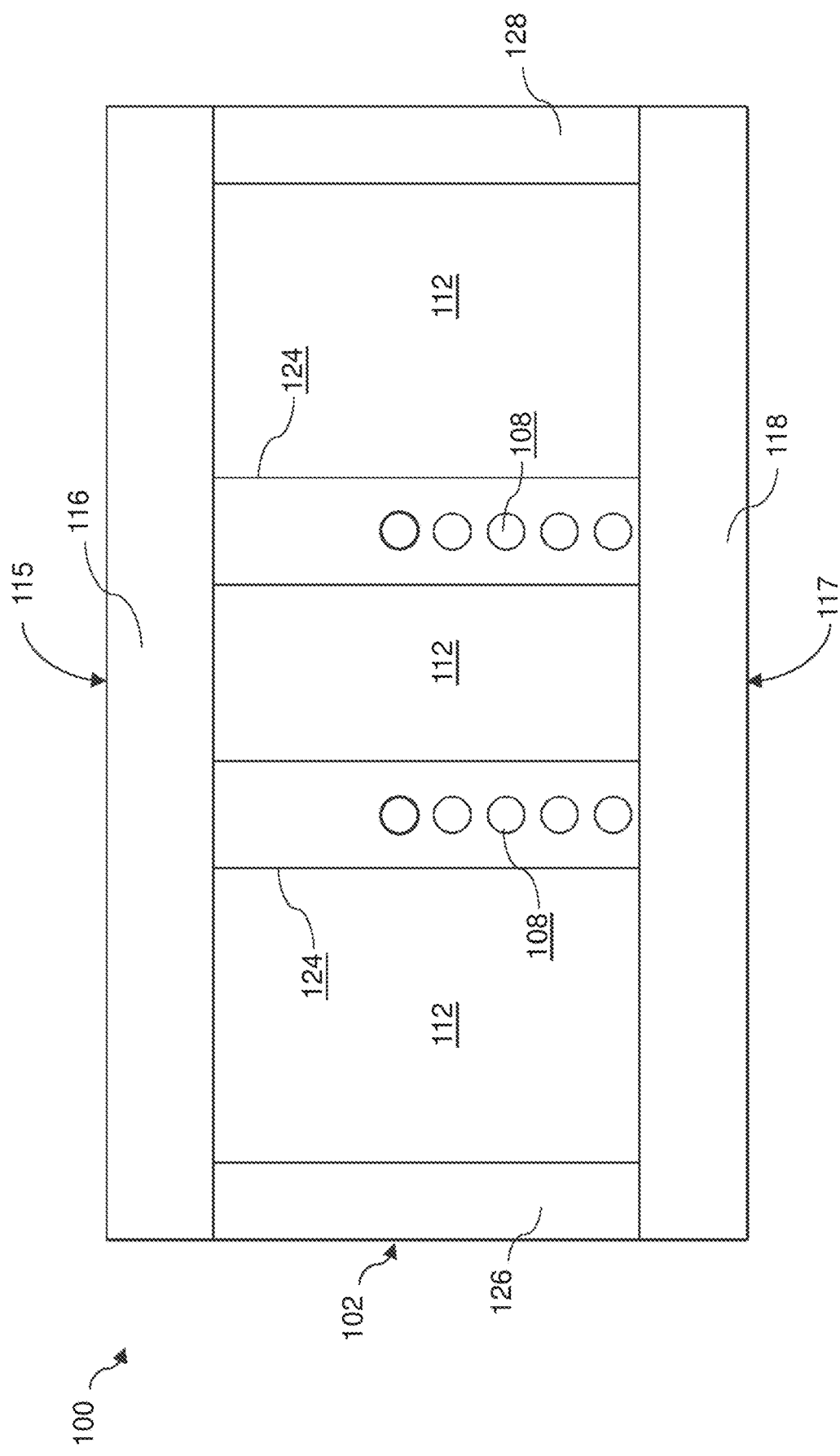
FIG. 12 shows a top view of a turbine shroud according to embodiments of the disclosure.

FIG. 12 shows a top view of body 102 extending axially between forward end 115 and aft end 117 and extending circumferentially between first sidewall 126 and second sidewall 128. Body 102 includes outer surface 112 extending between first sidewall 126 and second sidewall 128 and positioned opposite inner surface 114, facing the hot gas flow path for turbomachine (see, FIGS. 3A and 3B). As shown, body 102 includes a pair of ribs 124 (which may be substituted for, or provided with, other structural members) extending axially between forward end 115 and aft end 117. Inlet passages 108 of cooling circuit 106 extend axially along, and radially through, a portion of rib 124.

FIGS. 13-16 illustrate various configurations of cooling circuit 106 for body 102 of FIG. 12.

Figure 13:
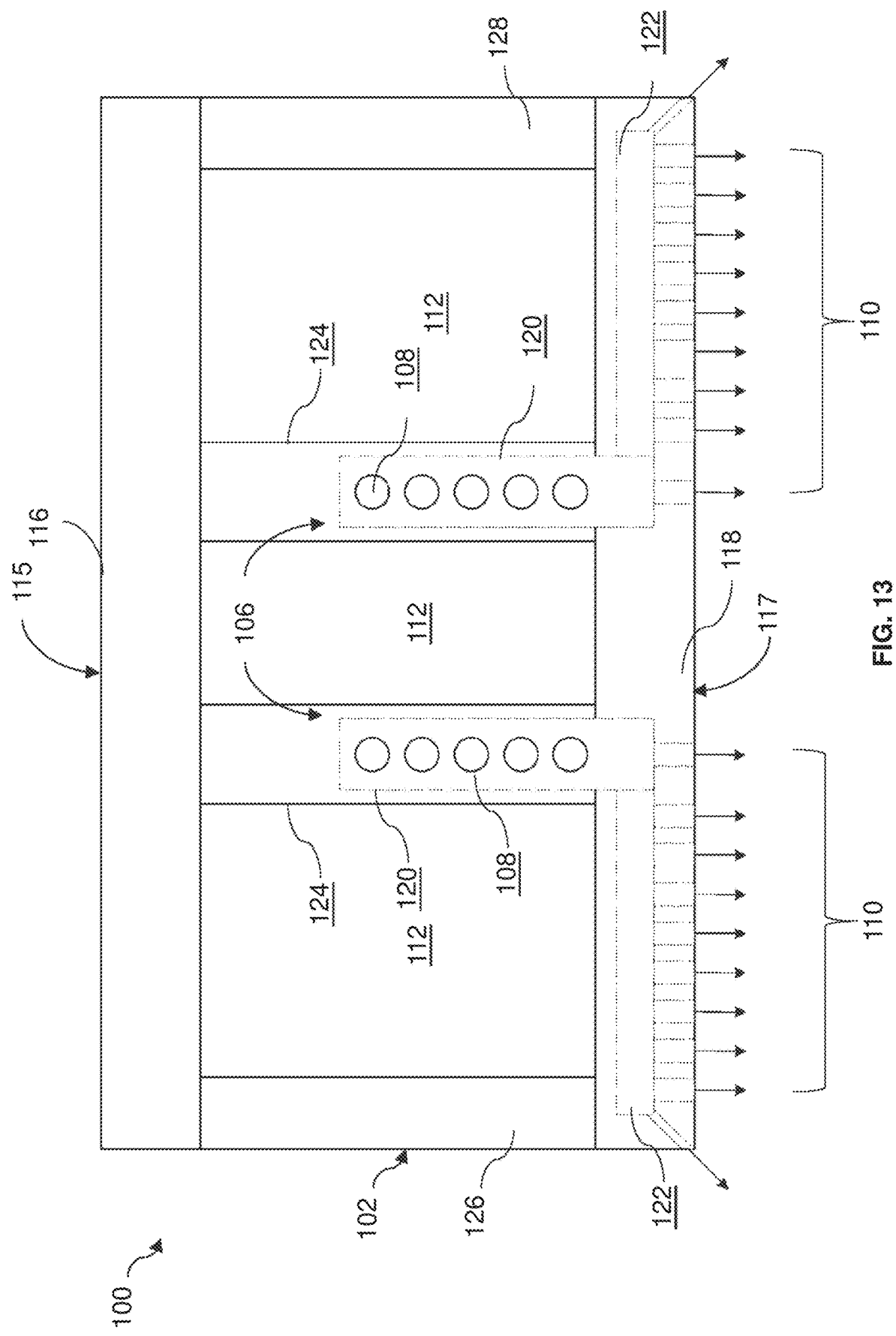
FIGS. 13-16 show various cross-section top views of the turbine shroud of FIG. 12 in various configurations according to embodiments of the disclosure.

FIG. 13 shows a cross-section top view of body 102 of FIG. 12, according to one embodiment. As shown, each rib 124 (or other structural member) includes one first plenum 120 extending therein, between outer surface 112 and inner surface 114. Each first plenum 120, respectively, is coupled with one second plenum 122 extending circumferentially within body 102. One or more outlet passages 110 are partially defined within body 102, as previously discussed herein regarding FIGS. 4-11. In the present embodiment, two cooling circuits 106 are provided with each including one first plenum 120 fluidly coupled to a respective second plenum 122, which extends beneath second hook 118 in the trailing edge proximate to aft end 117.

Figure 14:
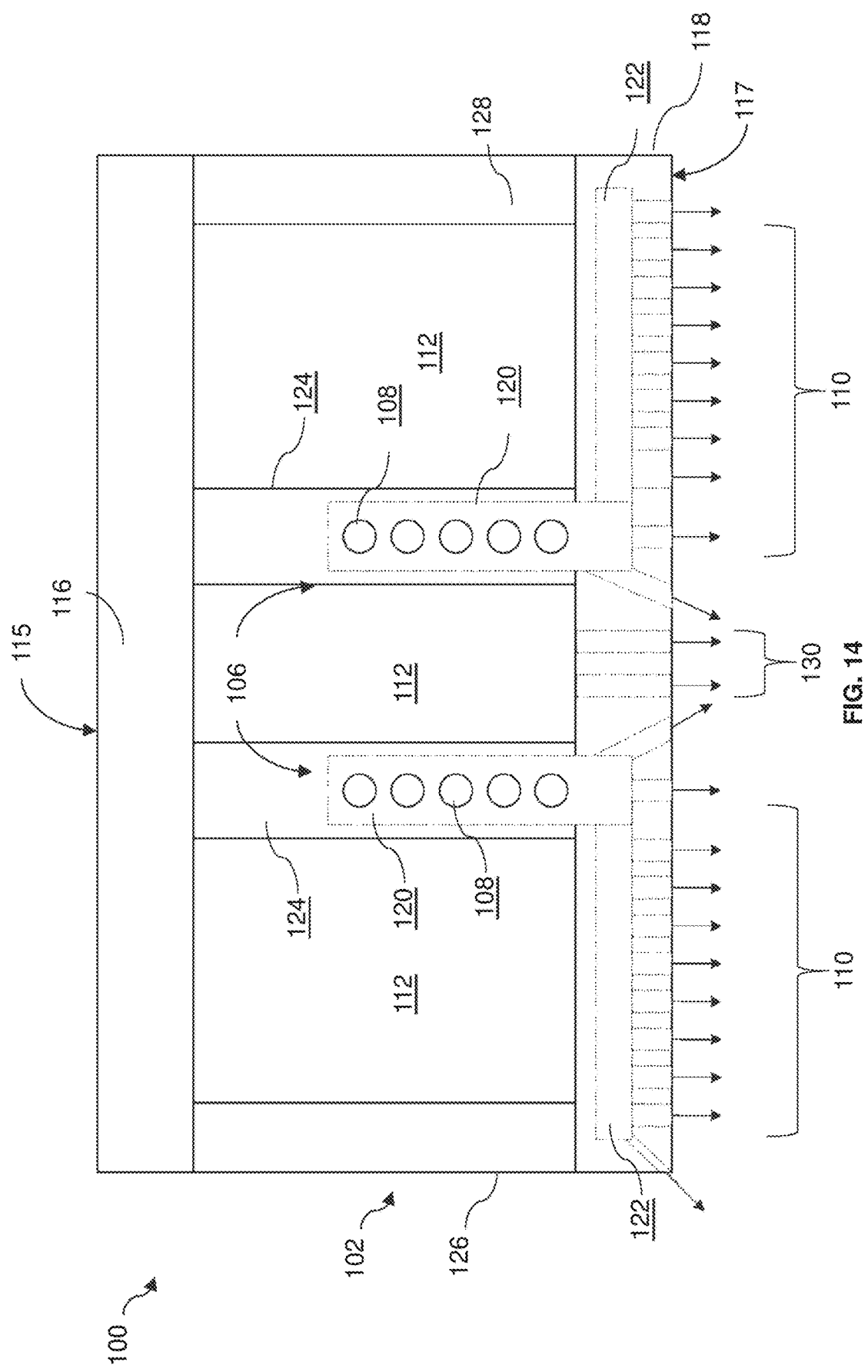
Figure 15:
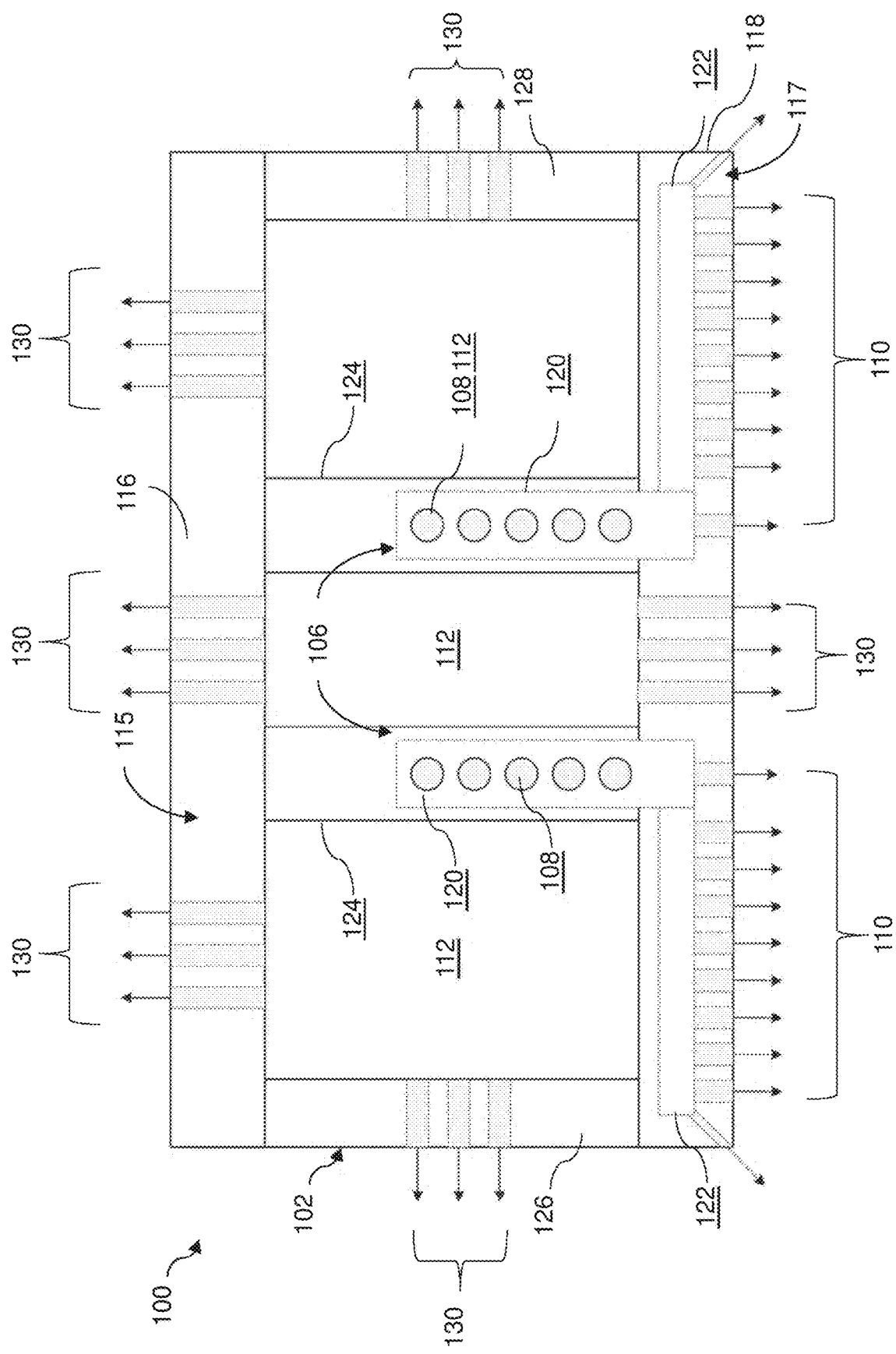

FIG. 14 shows a cross-section top view of body 102 of FIG. 12, according to another embodiment. As shown, each rib 124 includes one first plenum 120 extending therein, between outer surface 112 and inner surface 114. Each first plenum 120, respectively, is coupled to a respective second plenum 122 extending circumferentially within body 102. One or more outlet passages 110 are partially defined within body 102, as previously discussed herein regarding FIGS. 4-13. Outlet passages 110 may be fluidly coupled to second plenum 122, but alternatively may be directly fluidly coupled to first plenum 120. In the present embodiment, cooling circuit 106 includes two second plenums 122 extending beneath second hook 118 in the trailing edge proximate to aft end 115. Body 102 further includes an additional cooling circuit 130 extending through an exterior surface of second hook 118 proximate to aft end 117. Additional cooling circuit 130 may include cooling passages extending through one or more of first hook 116, second hook 118, first sidewall 126, and/or second sidewall 128. For instance, FIG. 15 shows a cross-section top view of body 102 of FIG. 12 according to another embodiment. As shown, additional cooling circuit 130 includes cooling passages extending through first sidewall 126, second sidewall 128, and first hook 116.

Figure 16:
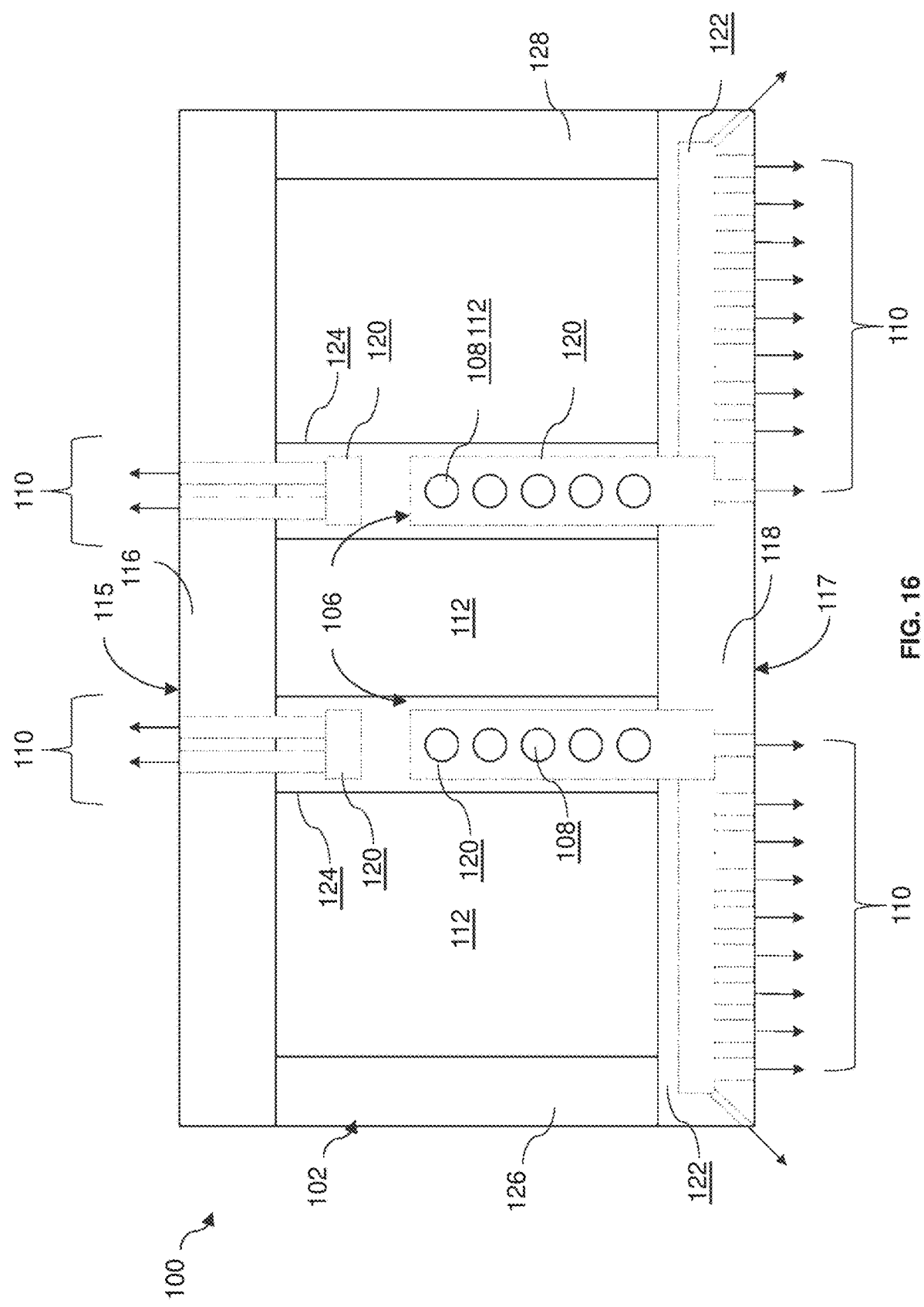

FIG. 16 illustrates a cross-section top-down view of another configuration of cooling circuit 106 for body 102 of FIG. 12. As shown, cooling circuit 106 further includes two additional first plenums 120, also coupled to cooling chamber 113 yet fluidly uncoupled from the other first plenums 120. These additional first plenums 120 are in fluid communication with outlet passages 110 extending through leading edge surface proximate to forward end 115.

It should be understood that alternative configurations for cooling circuit 106 are contemplated within the scope of the present disclosure.

Figure 17:
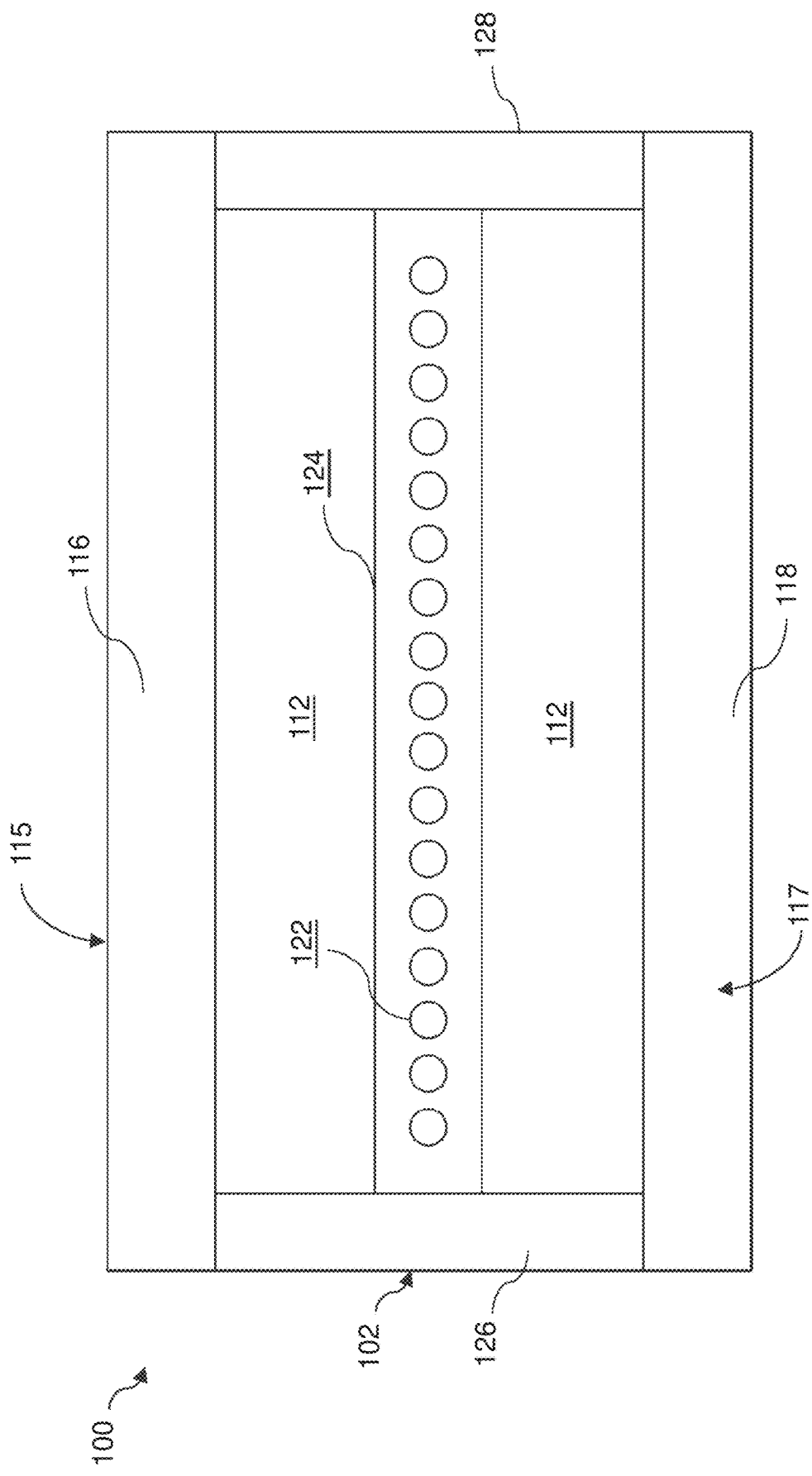
FIG. 17 shows a top view of a turbine shroud according to another embodiment of the disclosure.
Figure 18:
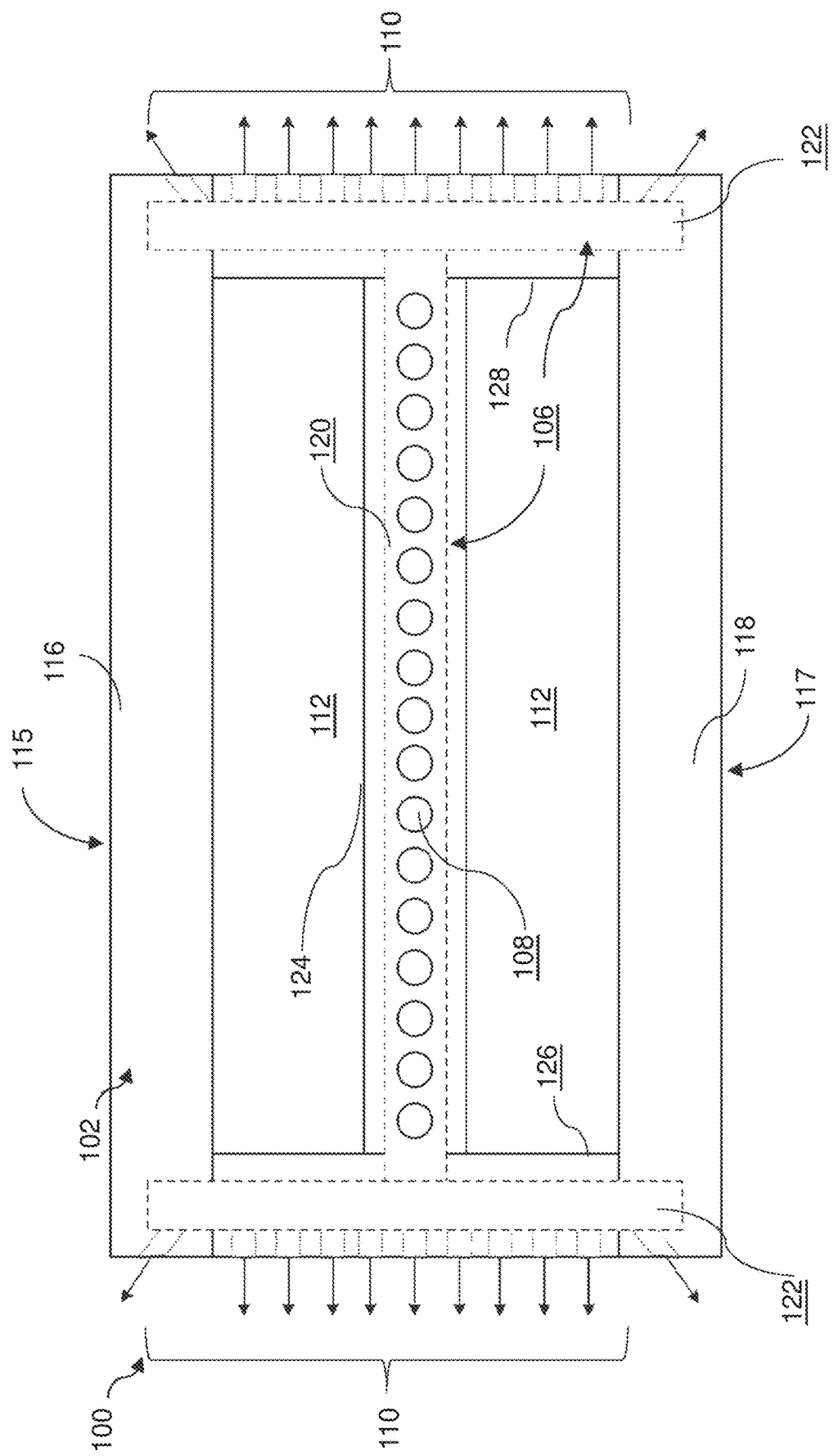
FIGS. 18-20 show various cross-section top views of the turbine shroud of FIG. 17 including various configurations, according to embodiments of the disclosure.
Figure 19:
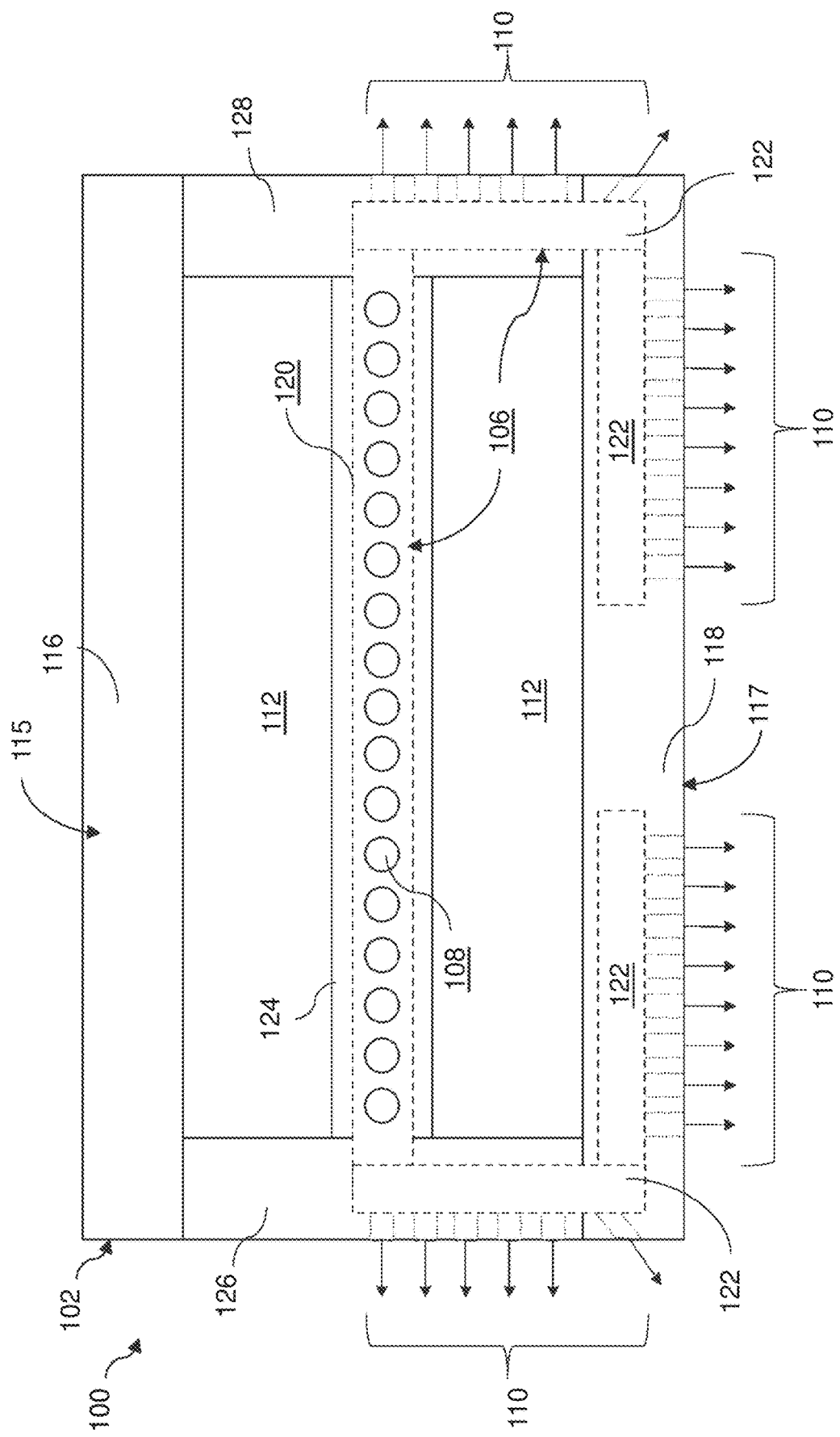
Figure 20:
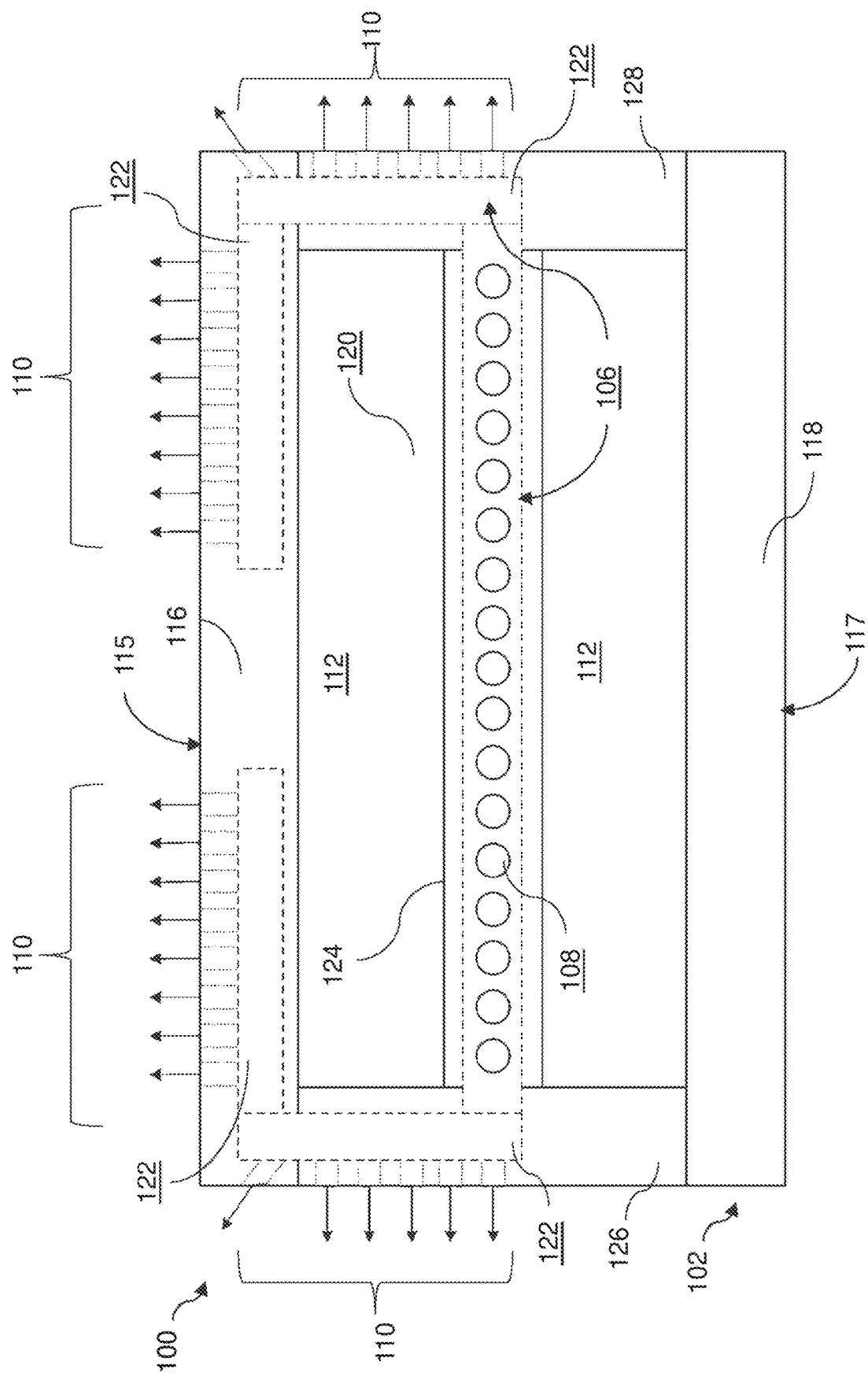

FIGS. 17-20 show various views of another non-limiting example of body 102 for turbine shroud 100. The non-limiting example of body 102 shown in FIGS. 17-20 may include similar features as discussed herein with respect to FIGS. 4-16 oriented and/or positioned in a distinct manner. FIG. 17 shows a top view of turbine shroud 100 including rib 124 extending circumferentially between first sidewall 126 and second sidewall 128. FIG. 18 shows a cross-section top-down view of body 102 of FIG. 17, according to one embodiment. As shown, turbine shroud 100 includes cooling circuit 106 extending within body 102 between forward end 115 and aft end 117. Cooling circuit 106 includes first plenum 120 extending circumferentially within rib 124 between first sidewall 126 and second sidewall 128. First plenum 120 is fluidly coupled to second plenums 122 that extend between forward end 115 and aft end 117. Cooling circuit 106 exhausts through outlet passages 110 in first sidewall 126 and second sidewall 128. FIG. 19 shows a cross-section top-down view of body 102 of FIG. 17 according to another embodiment. Cooling circuit 106 includes first plenum 120 extending circumferentially within rib 124 between first sidewall 126 and second sidewall 128. First plenum 120 is fluidly coupled to second plenums 122 that extend between rib 124 and aft end 117 and that extend along a portion of aft end 117. Cooling circuit 106 exhausts through outlet passages 110 in an aft portion of first sidewall 126, an aft portion of second sidewall 128, and at least a portion of aft end 117. FIG. 20 shows a cross-section top-down view of body 102 of FIG. 17 according to another embodiment. Cooling circuit 106 includes first plenum 120 extending circumferentially within rib 124 between first sidewall 126 and second sidewall 128. First plenum 120 is fluidly coupled to second plenums 122 that extend between rib 124 and forward end 115 and that extend along a portion of forward end 115. Cooling circuit 106 exhausts through outlet passages 110 in a forward portion of first sidewall 126, a forward portion of second sidewall 128, and at least a portion of forward end 115.

Figure 21:
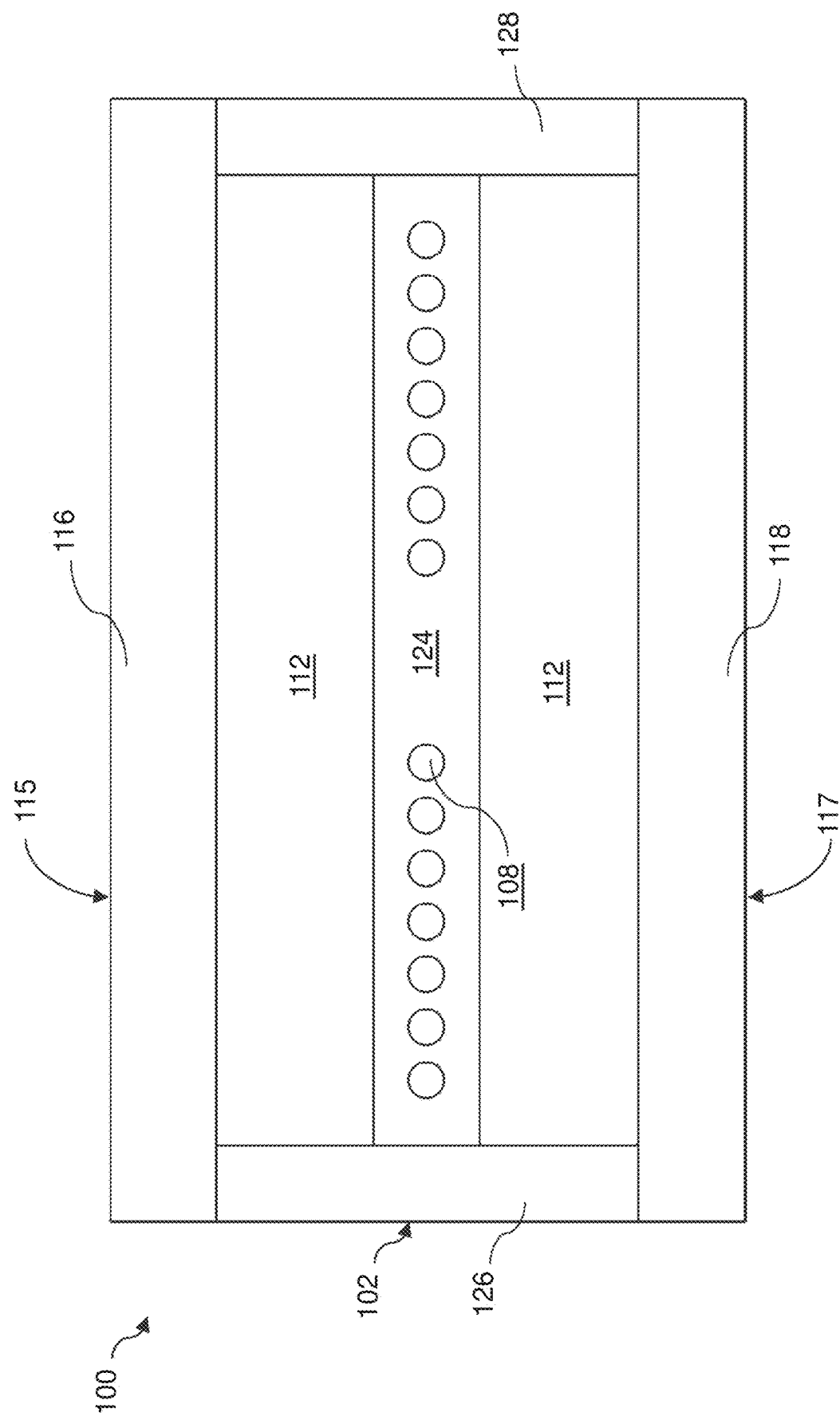

FIGS. 21 and 22 show various views of another non-limiting example of body 102 according to some embodiments. The non-limiting example of turbine shroud 100 shown in FIGS. 21 and 22 may include similar features as discussed herein with respect to FIGS. 4-20 oriented and/or positioned in a distinct manner. FIG. 21 shows a top view of body 102 including rib 124 extending circumferentially between first sidewall 126 and second sidewall 128. FIG. 22 shows a cross-section top-down view of body 102 of FIG. 21. As shown, body 102 includes cooling circuit 106 extending within body 102 between forward end 115 and aft end 117. FIG. 22 is similar to the embodiment shown in FIG. 18, although the FIG. 22 embodiment includes two first plenums 120, which are fluidly isolated from one another. Each first plenum 120 is fluidly coupled to a respective second plenum 122, which extends from forward end 115 to aft end 117. Cooling circuit 106 exhausts through outlet passages 110 along first sidewall 126 and second sidewall 128, although outlet passages in other locations may also be employed.

FIGS. 23A, 23B, 23C, 23D, and 23E illustrate various cross-sectional views of several non-limiting embodiments of a collection plenum of cooling circuit 106 such as first plenum 120 and/or second plenum 122. As shown, in some embodiments, first plenum 120 is shaped and dimensioned such that the cross-section of first plenum 120 is circular, or substantially circular, as shown in FIG. 23A. In other embodiments, first plenum 120 is shaped and dimensioned such that the cross-section of first plenum 120 is rectangular, or substantially rectangular, as shown in FIG. 23B. In other embodiments, first plenum 120 is shaped and dimensioned such that the cross-section of first plenum 120 is oval or elliptical, or substantially oval or elliptical, as shown in FIG. 23C. In other embodiments, first plenum 120 is shaped and dimensioned such that the cross-section of first plenum 120 includes one or more rounded corners (e.g., fillets) as shown in FIG. 23D. In other embodiments, first plenum 120 is shaped and dimensioned such that the cross-section of plenum 120 is triangular, or substantially triangular, as shown in FIG. 23E. In another embodiment, cooling circuit 106 includes two or more collection plenums that each have a distinct cross-section shape and dimension. For example, first plenum 120 may have a circular cross-section, and second plenum 120 may have a rectangular cross-section or a polygonal cross-section with rounded corners.

Figure 24:
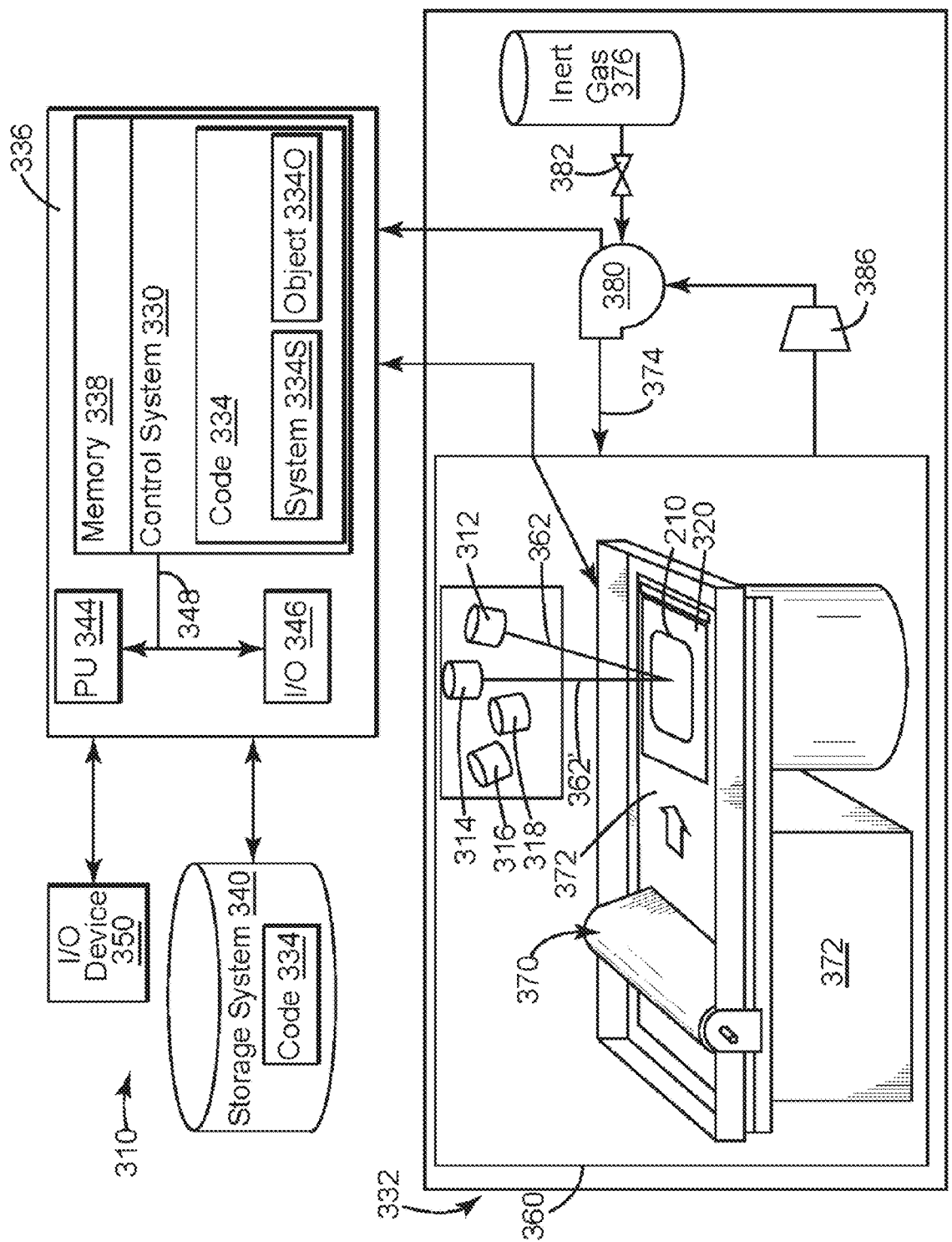
FIG. 24 shows a schematic block diagram of an illustrative additive manufacturing system for additive manufacturing components according to various embodiments of the disclosure.

FIG. 24 shows a schematic/block view of an illustrative computerized metal powder additive manufacturing system 310 (hereinafter 'AM system 310') for generating turbine shroud 100, of which only a single layer is shown. Turbine shroud 100 can be made separately or as an integral unitary piece. The teachings of the disclosure will be described relative to building turbine shroud 100 using multiple melting beam sources 312, 314, 316, 318, but it is emphasized and will be readily recognized that the teachings of the disclosure are equally applicable to build turbine shroud 100 using any number of melting beam sources. In this example, AM system 310 is arranged for direct metal laser melting (DMLM). It is understood that the general teachings of the disclosure are equally applicable to other forms of metal powder additive manufacturing such as but not limited to selective laser melting (SLM), and perhaps other forms of additive manufacturing (i.e., other than metal powder applications). The layer of turbine shroud 100 in build platform 320 is illustrated as a generally rectangular element in FIG. 24; however, it is understood that the additive manufacturing process can be readily adapted to manufacture any shaped part of shroud 100 on build platform 320.

AM system 310 generally includes an additive manufacturing control system 330 ("control system") and an AM printer 332. As will be described, control system 330 executes set of computer-executable instructions or code 334 to generate turbine shroud 100 using multiple melting beam sources 312, 314, 316, 318. In the example shown, four melting beam sources may include four lasers. However, the teachings of the disclosures are applicable to any melting beam source, e.g., an electron beam, laser, etc. Control system 330 is shown implemented on computer 336 as computer program code. To this extent, computer 336 is shown including a memory 338 and/or storage system 340, a processor unit (PU) 344, an input/output (I/O) interface 346, and a bus 348. Further, computer 336 is shown in communication with an external I/O device/resource 350. In general, processor unit (PU) 344 executes computer program code 334 that is stored in memory 338 and/or storage system 340. While executing computer program code 334, processor unit (PU) 344 can read and/or write data to/from memory 338, storage system 340, I/O device 350 and/or AM printer 332. Bus 348 provides a communication link between each of the components in computer 336, and I/O device 350 can comprise any device that enables a user to interact with computer 336 (e.g., keyboard, pointing device, display, etc.).

Computer 336 is only representative of various possible combinations of hardware and software. For example, processor unit (PU) 344 may comprise a single processing unit or be distributed across one or more processing units in one or more locations, e.g., on a client and server. Similarly, memory 338 and/or storage system 340 may reside at one or more physical locations. Memory 338 and/or storage system 340 can comprise any combination of various types of non-transitory computer readable storage medium including magnetic media, optical media, random access memory (RAM), read only memory (ROM), etc. Computer 336 can comprise any type of computing device such as an industrial controller, a network server, a desktop computer, a laptop, a handheld device, etc.

As noted, AM system 310 and, in particular control system 330, executes code 334 to generate turbine shroud 100. Code 334 can include, among other things, a set of computer-executable instructions 334S (herein also referred to as 'code 334S') for operating AM printer 332, and a set of computer-executable instructions 334O (herein also referred to as 'code 334O') defining turbine shroud 100 to be physically generated by AM printer 332. As described herein, additive manufacturing processes begin with a non-transitory computer readable storage medium (e.g., memory 338, storage system 340, etc.) storing code 334. Set of computer-executable instructions 334S for operating AM printer 332 may include any now known or later developed software code capable of operating AM printer 332.

The set of computer-executable instructions 334O defining turbine shroud 100 may include a precisely defined 3D model of turbine shroud 100 and can be generated from any of a large variety of well-known computer aided design (CAD) software systems such as AutoCAD®, TurboCAD®, DesignCAD 3D Max, etc. In this regard, code 334O can include any now known or later developed file format. Furthermore, code 334O representative of turbine shroud 100 may be translated between different formats. For example, code 334O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 334O representative of turbine shroud 100 may also be converted into a set of data signals and transmitted, received as a set of data signals and converted to code, stored, etc., as necessary. Code 334O may be configured according to embodiments of the disclosure to allow for formation of border and internal sections in overlapping field regions, as will be described. In any event, code 334O may be an input to AM system 310 and may come from a part designer, an intellectual property (IP) provider, a design company, the operator or owner of AM system 310, or from other sources. In any event, control system 330 executes code 334S and 334O, dividing turbine shroud 100 into a series of thin slices that assembles using AM printer 332 in successive layers of material.

AM printer 332 may include a processing chamber 360 that is sealed to provide a controlled atmosphere for turbine shroud 100 printing. A build platform 320, upon which turbine shroud 100 is built, is positioned within processing chamber 360. A number of melting beam sources 312, 314, 316, 318 are configured to melt layers of metal powder on build platform 320 to generate turbine shroud 100. While four melting beam sources 312, 314, 316, 318 are illustrated, it is emphasized that the teachings of the disclosure are applicable to a system employing any number of sources, e.g., 1, 2, 3, or 5 or more. As understood in the field, each melting beam source 312, 314, 316, 318 may have a field including a non-overlapping field region, respectively, in which it can exclusively melt metal powder, and may include at least one overlapping field region in which two or more sources can melt metal powder. In this regard, each melting beam source 312, 314, 316, 318 may generate a melting beam, respectively, that fuses particles for each slice, as defined by code 334O. For example, in FIG. 25, melting beam source 312 is shown creating a layer of turbine shroud 100 using melting beam 362 in one region, while melting beam source 314 is shown creating a layer of turbine shroud 100 using melting beam 362' in another region. Each melting beam source 312, 314, 316, 318 is calibrated in any now known or later developed manner. That is, each melting beam source 312, 314, 316, 318 has had its laser or electron beam's anticipated position relative to build platform 320 correlated with its actual position in order to provide an individual position correction (not shown) to ensure its individual accuracy. In one embodiment, each of plurality melting beam sources 312, 314, 316, 318 may create melting beams, e.g., 362, 362', having the same cross-sectional dimensions (e.g., shape and size in operation), power and scan speed.

Continuing with FIG. 24, an applicator (or re-coater blade) 370 may create a thin layer of raw material 372 spread out as the blank canvas from which each successive slice of the final turbine shroud 100 will be created. Various parts of AM printer 332 may move to accommodate the addition of each new layer, e.g., a build platform 320 may lower and/or chamber 360 and/or applicator 370 may rise after each layer. The process may use different raw materials in the form of fine-grain metal powder, a stock of which may be held in a powder reservoir 368 accessible by applicator 370.

Processing chamber 360 is filled with an inert gas such as argon or nitrogen and controlled to minimize or eliminate oxygen. Control system 330 is configured to control a flow of a gas mixture 374 within processing chamber 360 from a source of inert gas 376. In this case, control system 330 may control a pump 380, and/or a flow valve system 382 for inert gas to control the content of gas mixture 374. Flow valve system 382 may include one or more computer controllable valves, flow sensors, temperature sensors, pressure sensors, etc., capable of precisely controlling flow of the particular gas. Pump 380 may be provided with or without valve system 382. Where pump 380 is omitted, inert gas may simply enter a conduit or manifold prior to introduction to processing chamber 360. Source of inert gas 376 may take the form of any conventional source for the material contained therein, e.g., a tank, reservoir or other source. Any sensors (not shown) required to measure gas mixture 374 may be provided. Gas mixture 374 may be filtered using a filter 386 in a conventional manner.

In operation, build platform 320 with metal powder thereon is provided within processing chamber 360, and control system 330 controls flow of gas mixture 374 within processing chamber 360 from source of inert gas 376. Control system 330 also controls AM printer 332, and in particular, applicator 370 and melting beam sources 312, 314, 316, 318 to sequentially melt layers of metal powder on build platform 320 to generate turbine shroud 100 according to embodiments of the disclosure. While a particular AM system 310 has been described herein, it is emphasized that the teachings of the disclosure are not limited to any particular additive manufacturing system or method.

The disclosure provides various technical and commercial advantages, examples of which are discussed herein. Turbine shroud 100 may provide a series of impingement cooling passages which cool large ribs via impingement cooling. Turbine shroud 100 may provide a cascading cooling circuit, which directs air through a series of collection plenums within turbine shroud 100. Turbine shroud 100 may reuse cooling air by directing cooling air exiting the series of impingement cooling passages onto one or more regions along the perimeter of turbine shroud 100.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and its practical application and to enable others of ordinary skill in the art to understand the disclosure for contemplating various embodiments with modifications as are suited to the particular given use.

What is claimed is:

1. A turbine shroud comprising:
   a body configured for coupling to a turbomachine casing, the body including a rib thereon and a forward end positioned opposite an aft end, wherein the rib is on a radially outward surface of the body, the rib extending from a first sidewall extending between the forward end and the aft end to a second sidewall extending between the forward end and the aft end opposite the first sidewall; and
   a cooling circuit within the body and in fluid communication with a cooling chamber defined radially outward of the body, the cooling circuit including:
      a plurality of inlet passages extending through the rib of the body and spaced along a length thereof,
      a plurality of outlet passages fluidly coupled to the plurality of inlet passages and extending through an external surface of the body, and
      a first plenum extending within the rib of the body and in fluid communication with the plurality of inlet passages.

2. The turbine shroud of claim 1, further comprising an impingement panel positioned between the rib and the cooling chamber, wherein the impingement panel includes a plurality of impingement holes fluidly coupling the cooling chamber to the plurality of inlet passages of the cooling circuit.

3. The turbine shroud of claim 2, wherein the impingement panel extends between a first hook and a second hook extending outward from the body.

4. The turbine shroud of claim 3, further comprising an intermediate component disposed between the body and the turbomachine casing, and wherein the first hook and the second hook engage respective recesses in the intermediate component.

5. The turbine shroud of claim 3, wherein the first hook and the second hook are configured to engage respective recesses in the turbomachine casing.

6. The turbine shroud of claim 1, wherein the cooling circuit further includes at least two second plenums fluidly coupled to the first plenum and within different structural members of the body, wherein the at least two second plenums fluidly couple the respective first plenums to the outlet passages.

7. The turbine shroud of claim 6, wherein one of the at least two second plenums is defined in the first sidewall, and one of the at least two second plenums is defined in the second sidewall.

8. The turbine shroud of claim 6, wherein one of the at least two second plenums is defined in the first sidewall and the aft end, and one of the at least two second plenums is defined in the second sidewall and the aft end.

9. The turbine shroud of claim 6, wherein one of the at least two second plenums is defined in the first sidewall and the forward end, and one of the at least two second plenums is defined in the second sidewall and the forward end.

10. The turbine shroud of claim 1, wherein the first plenum is one of at least two first plenums extending within the rib of the body, and the cooling circuit includes at least two second plenums fluidly coupled to respective first plenums and within different structural members of the body, wherein the at least two second plenums fluidly couple the respective first plenums to outlet passages defined in the first sidewall and second sidewall.

11. The turbine shroud of claim 1, wherein the plurality of inlet passages are shaped to direct a cooling air into the first plenum and toward an underside surface of the rib.

12. A turbomachine comprising:
a blade structure configured to rotate about a rotation axis of a rotor; and
a turbine shroud oriented toward the blade structure and coupled to a turbomachine casing, the turbine shroud including:
a body configured for coupling to a turbomachine casing, the body including a rib thereon and a forward end positioned opposite an aft end, wherein the rib is on a radially outward surface of the body, the rib extending from a first sidewall extending between the forward end and the aft end to a second sidewall extending between the forward end and the aft end opposite the first sidewall; and
a cooling circuit within the body and in fluid communication with a cooling chamber defined radially outward of the body, the cooling circuit including:
a plurality of inlet passages extending through the rib of the body and spaced along a length thereof, and
a plurality of outlet passages fluidly coupled to the inlet passages and extending through an external surface of the body,
at least one first plenum extending within the rib and in fluid communication with the plurality of inlet passages, and
at least one second plenum fluidly coupled to the first plenum and within a different structural member of the body, wherein the second plenum fluidly couples the first plenum to the plurality of outlet passages.

13. The turbomachine of claim 12, further comprising an impingement panel positioned between the rib of the body and the cooling chamber, wherein the impingement panel includes a plurality of impingement holes fluidly coupling the cooling chamber to the plurality of inlet passages of the cooling circuit.

14. The turbomachine of claim 12, wherein the cooling circuit further includes at least two second plenums fluidly coupled to respective first plenums and within different structural members of the body, wherein the at least two second plenums fluidly couple the respective first plenums to the outlet passages.

15. The turbine shroud of claim 14, wherein one of the at least two second plenums is defined in the first sidewall, and one of the at least two second plenums is defined in the second sidewall.

16. The turbine shroud of claim 14, wherein one of the at least two second plenums is defined in the first sidewall and the aft end, and one of the at least two second plenums is defined in the second sidewall and the aft end.

17. The turbine shroud of claim 14, wherein one of the at least two second plenums is defined in the first sidewall and the forward end, and one of the at least two second plenums is defined in the second sidewall and the forward end.

18. A turbine shroud comprising:
a body configured for coupling to a turbomachine casing, the body including a rib thereon and a forward end positioned opposite an aft end, wherein the rib is on a radially outward surface of the body, the rib extending from a first sidewall extending between the forward end and the aft end to a second sidewall extending between the forward end and the aft end opposite the first sidewall; and
a cooling circuit within the body and in fluid communication with a cooling chamber defined radially outward of the body, the cooling circuit including:
a plurality of inlet passages extending through the rib of the body and spaced along a length thereof,
a plurality of outlet passages fluidly coupled to the inlet passages and extending through an external surface of the body, and
a first plenum extending within the rib of the body and in fluid communication with the plurality of inlet passages,
wherein the plurality of inlet passages are shaped to direct a cooling air into the first plenum and toward an underside surface of the rib.

19. The turbine shroud of claim 18, wherein the cooling circuit further includes at least two second plenums fluidly coupled to the first plenum and within different structural members of the body, wherein the at least two second plenums fluidly couple the respective first plenums to the outlet passages.

20. The turbine shroud of claim 19, wherein one of the at least two second plenums is defined in the first sidewall, and one of the at least two second plenums is defined in the second sidewall.

* * * * *